(12) United States Patent
Blosser et al.

(10) Patent No.: US 10,458,763 B2
(45) Date of Patent: Oct. 29, 2019

(54) CUT-ON-CONTACT BROADHEAD

(71) Applicant: FeraDyne Outdoors, LLC, Superior, WI (US)

(72) Inventors: Benjamin D. Blosser, Corydon, KY (US); Jon Arthur Syverson, Cloquet, MN (US)

(73) Assignee: FeraDyne Outdoors, LLC, Superior, WI (US)

( * ) Notice: Subject to any disclaimer, the term of this patent is extended or adjusted under 35 U.S.C. 154(b) by 0 days.

(21) Appl. No.: 16/161,713

(22) Filed: Oct. 16, 2018

(65) Prior Publication Data

US 2019/0113316 A1    Apr. 18, 2019

Related U.S. Application Data

(60) Provisional application No. 62/574,168, filed on Oct. 18, 2017.

(51) Int. Cl.
*F42B 6/08* (2006.01)

(52) U.S. Cl.
CPC ..................... *F42B 6/08* (2013.01)

(58) Field of Classification Search
CPC ........................................ F42B 6/08
See application file for complete search history.

(56) References Cited

U.S. PATENT DOCUMENTS

| | | | | |
|---|---|---|---|---|
| 4,676,512 A * | 6/1987 | Simo | ........................ | F42B 6/08 473/584 |
| 5,046,744 A * | 9/1991 | Eddy | ........................ | F42B 6/08 473/583 |
| 5,178,398 A * | 1/1993 | Eddy | ........................ | F42B 6/08 473/583 |
| 5,458,341 A * | 10/1995 | Forrest | ..................... | F42B 6/08 473/583 |
| 5,879,252 A * | 3/1999 | Johnson | .................... | F42B 6/08 473/583 |
| 7,377,869 B2 * | 5/2008 | Wohlfeil | ................... | F42B 6/08 473/583 |
| 8,057,331 B2 | 11/2011 | Hudkins | | |
| 8,272,979 B1 | 9/2012 | Cooper | | |
| 8,512,178 B2 * | 8/2013 | Peetz | ........................ | F42B 6/08 473/583 |
| 2009/0124438 A1 | 5/2009 | Perkins, Jr. | | |
| 2017/0176155 A1 | 6/2017 | Furia et al. | | |

* cited by examiner

*Primary Examiner* — John A Ricci

(74) *Attorney, Agent, or Firm* — Greenberg Traurig, LLP; Dipak J. Shah

(57) ABSTRACT

A cut-on-contact broadhead having a plurality of deployable blades. Each of the plurality of blades is pivotally coupled to a ferrule configured for attaching the broadhead to a shaft of an arrow or a bolt. Each of the plurality of blades includes a tip, an impact region, a first cutting edge, and a second cutting edge. During flight, blades are in a fully retracted state forming a distal tip of the broadhead having sharp cutting edges defined at least in part by the first cutting edges of the blades. Upon impact, the distal tip of the broadhead creates a bore in the target. As the broadhead penetrates the target, the plurality of blades are deployed into a swept-back configuration exposing the second cutting edge of each blade. The second cutting edges expand the bore initiated by the distal tip of the broadhead and create a passage in the target.

16 Claims, 28 Drawing Sheets

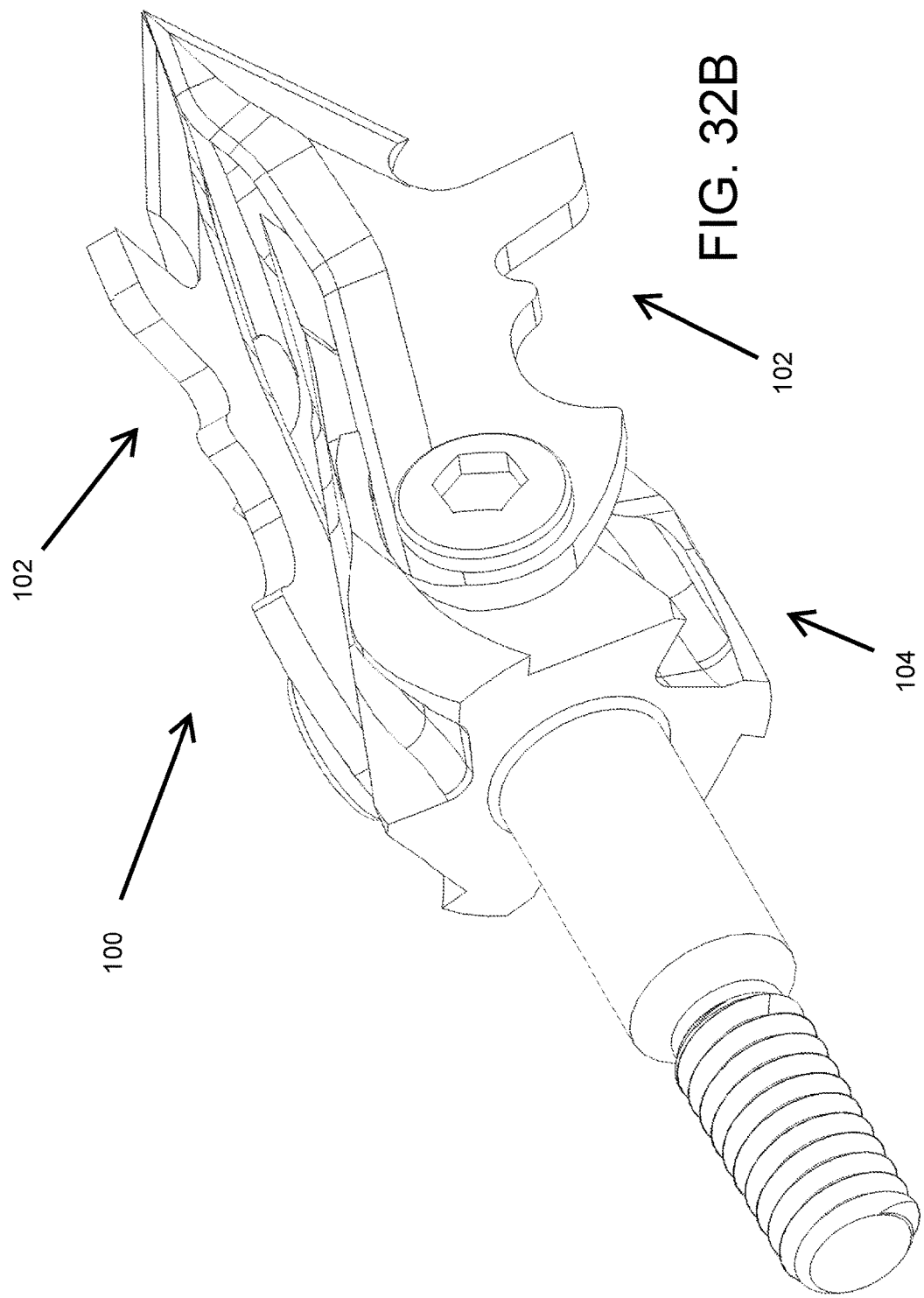

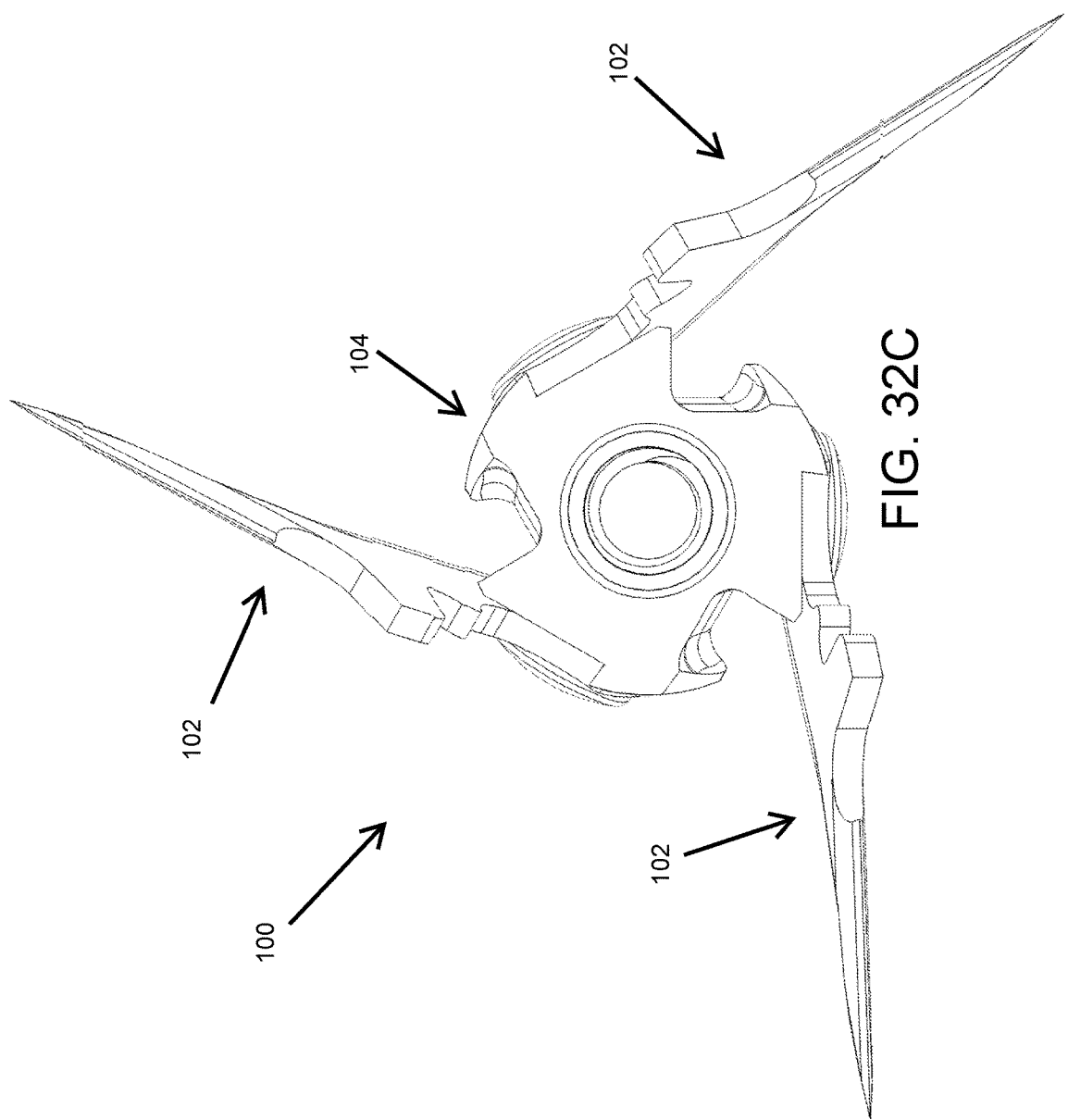

CUT-ON-CONTACT BROADHEAD

CROSS-REFERENCE TO RELATED APPLICATIONS

This application claims the benefit of U.S. Provisional Patent Application No. 62/574,168 filed Oct. 18, 2017, which is herein incorporated by reference in its entirety.

STATEMENT REGARDING FEDERALLY SPONSORED RESEARCH OR DEVELOPMENT

Not applicable.

TECHNICAL FIELD

The instant disclosure relates to archery. More particularly, the instant disclosure pertains to broadheads.

BACKGROUND

A wide range of arrowhead designs suitable for archery are commercially available. One category of arrowheads is the broadhead—a bladed arrowhead featuring multiple sharp cutting blades that are designed to greatly increase the effective cutting area of the arrowhead when it impacts a target. Broadheads are popular in the bowhunting industry, as the increased cutting radius of a broadhead results in larger entrance and exit wounds in a game animal struck by the broadhead, causing increased blood loss which kills the animal quickly and humanely, and provides a better blood trail for tracking and retrieval of the carcass.

While broadheads provide an improved cutting capability when compared to non-bladed field point or nib point arrowheads, some broadhead designs suffer from inferior aerodynamic properties in comparison with their non-bladed counterparts. The blades of the broadhead, if deployed during the flight of an arrow, can result in undesirable effects and cause the arrow to veer off course from the flight path.

Prior art broadhead designs have attempted to resolve the aerodynamic issues by retaining, at least in part, the deployable cutting blades of the broadhead within the ferrule body of the broadhead during flight. Upon impacting the target, the blades are deployed, moving outwardly from the ferrule body and exposing the sharp cutting edges of the blades once fully deployed. Such designs are known by those skilled in the art as an "expandable broadhead."

SUMMARY

A non-limiting exemplary embodiment of a broadhead includes a ferrule and a plurality of deployable blades. In some non-limiting exemplary embodiments, the ferrule is defined at least in part by a distal end and a proximal end, and includes a plurality of recesses extending proximally from proximate the distal end, and a plurality of channels extending proximally from proximate the distal end, wherein each channel is disposed between adjacent recesses. In certain non-limiting exemplary embodiments, at least a portion of each blade of the plurality of blades is disposed within and is pivotally coupled to one of the plurality of channels. In some non-limiting exemplary embodiments, each blade of the plurality of blades includes a tip, an impact region, a first cutting edge extending from the tip to proximate the impact region, and a second cutting edge extending from the tip to proximate the channel to which the blade is pivotally coupled. In certain non-limiting exemplary embodiments, during flight, at least a portion of the second edge of each blade of the plurality of blades is retained within at least a portion of the channel to which the blade is pivotally coupled, and the tips of each blade converge to form a chisel tip having cutting edges defined at least in part by the first cutting edge of each blade of the plurality of blades.

BRIEF DESCRIPTION OF THE DRAWINGS

FIG. 32B is a perspective view of the broadhead of FIG. 32A illustrated with the plurality of blades in a fully retracted state; and FIG. 32C is an elevation view of the broadhead of FIG. 3A as viewed from a proximal end of the broadhead.

DETAILED DESCRIPTION

One or more non-limiting embodiments are described herein with reference to the accompanying drawings, wherein like numerals designate like elements. It should be clearly understood that there is no intent, implied or otherwise, to limit the disclosure in any way, shape or form to the embodiments illustrated and described herein. While multiple exemplary embodiments are provided, variations thereof will become apparent or obvious to a person of ordinary skills. Accordingly, any and all variants for providing functionalities similar to those described herein are considered as being within the metes and bounds of the instant disclosure.

Figure 1:
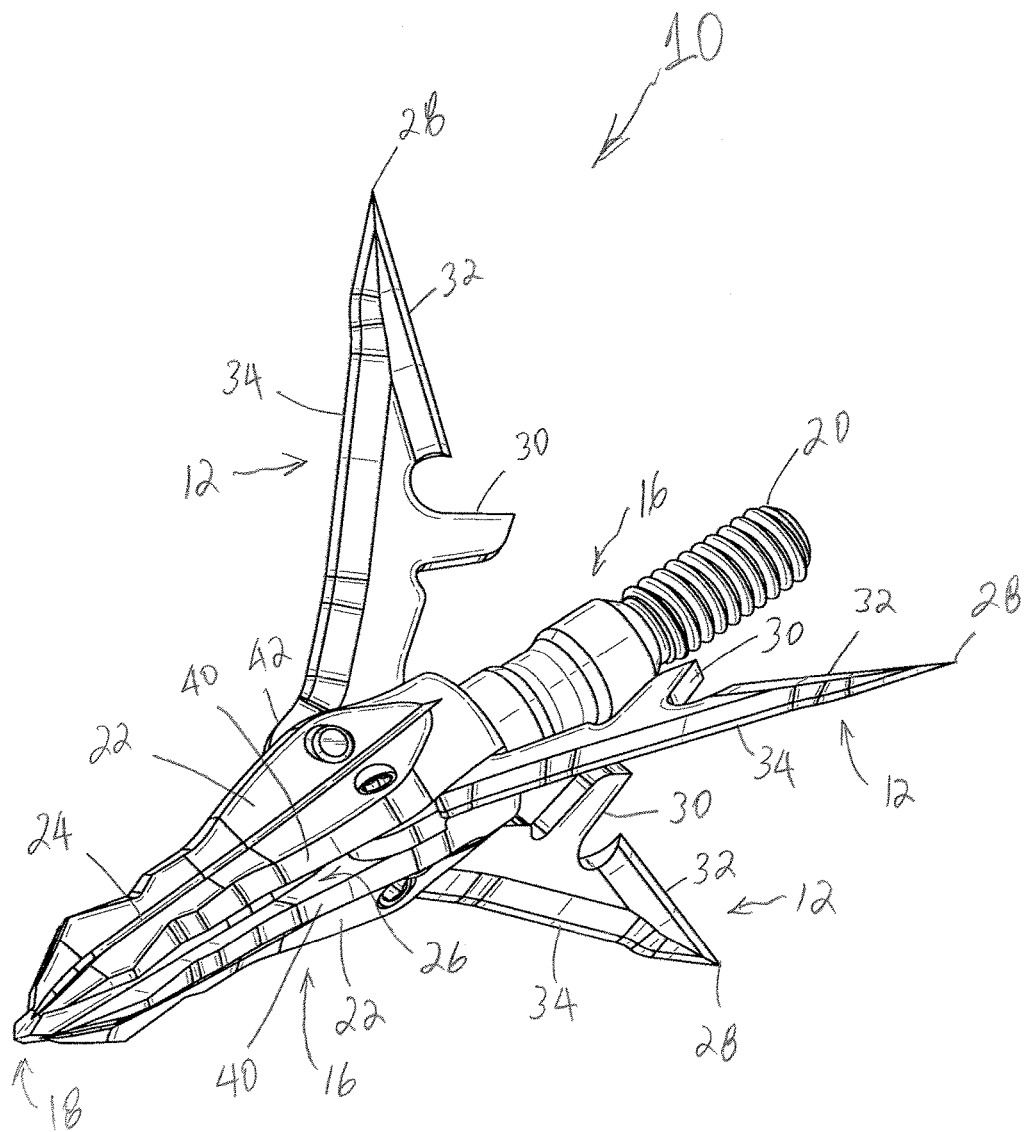
FIG. 1 is a perspective view of a non-limiting exemplary embodiment of a broadhead of the instant disclosure illustrated with a plurality of blades in a fully deployed state.
Figure 2:
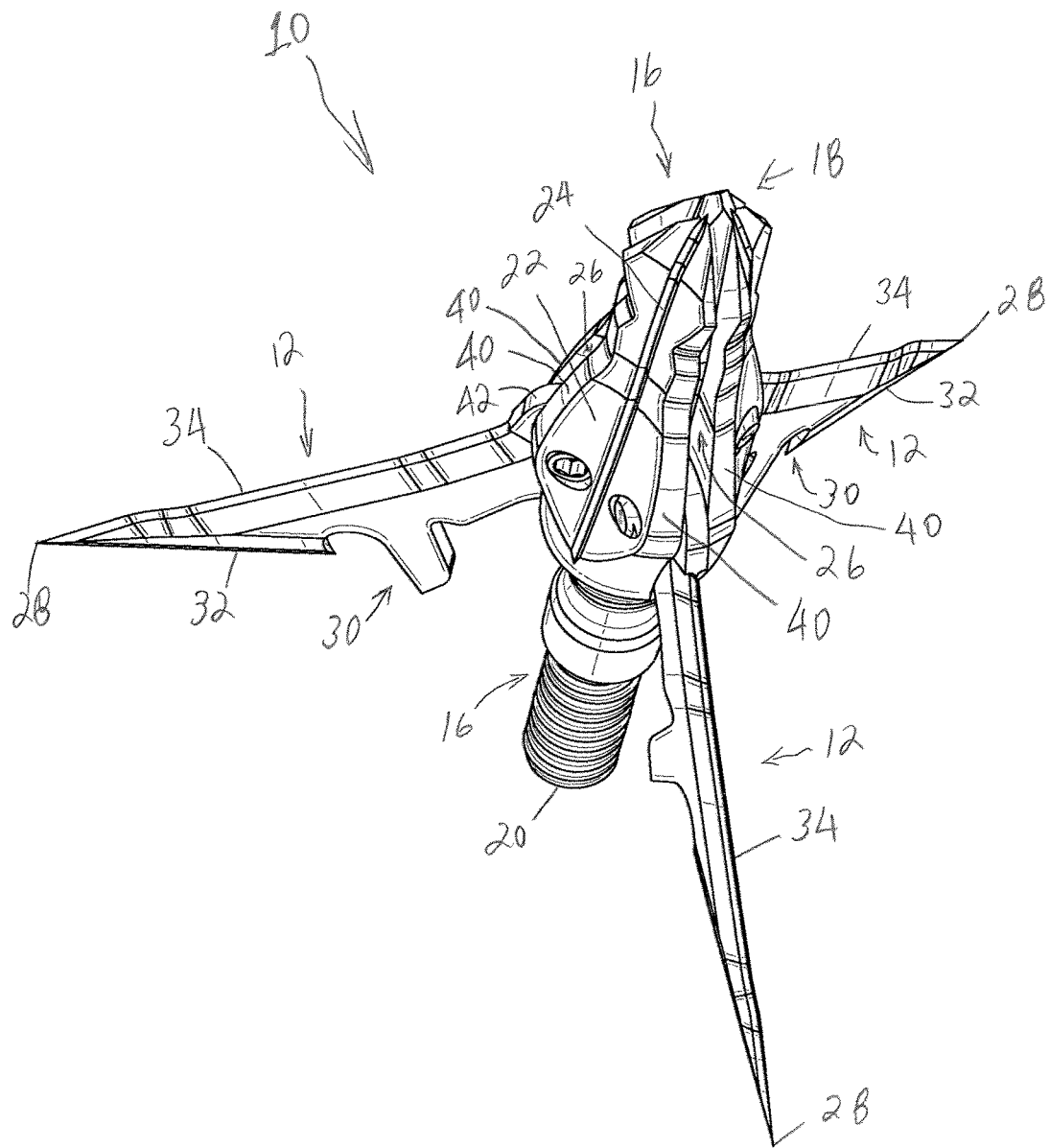
FIG. 2 is another perspective view of the broadhead of FIG. 1.
Figure 3:
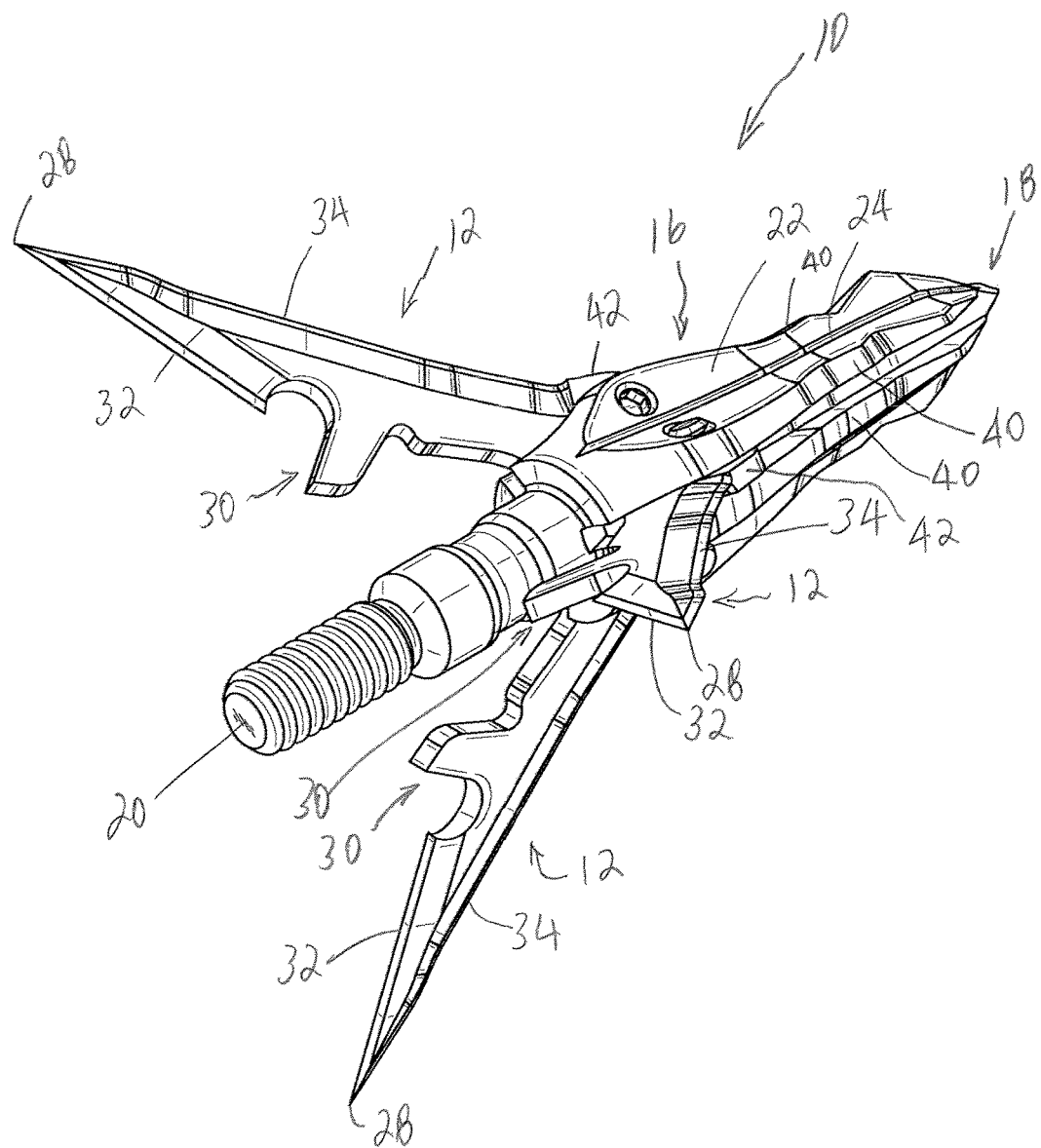
FIG. 3 is another perspective view of the broadhead of FIG. 1.
Figure 4:
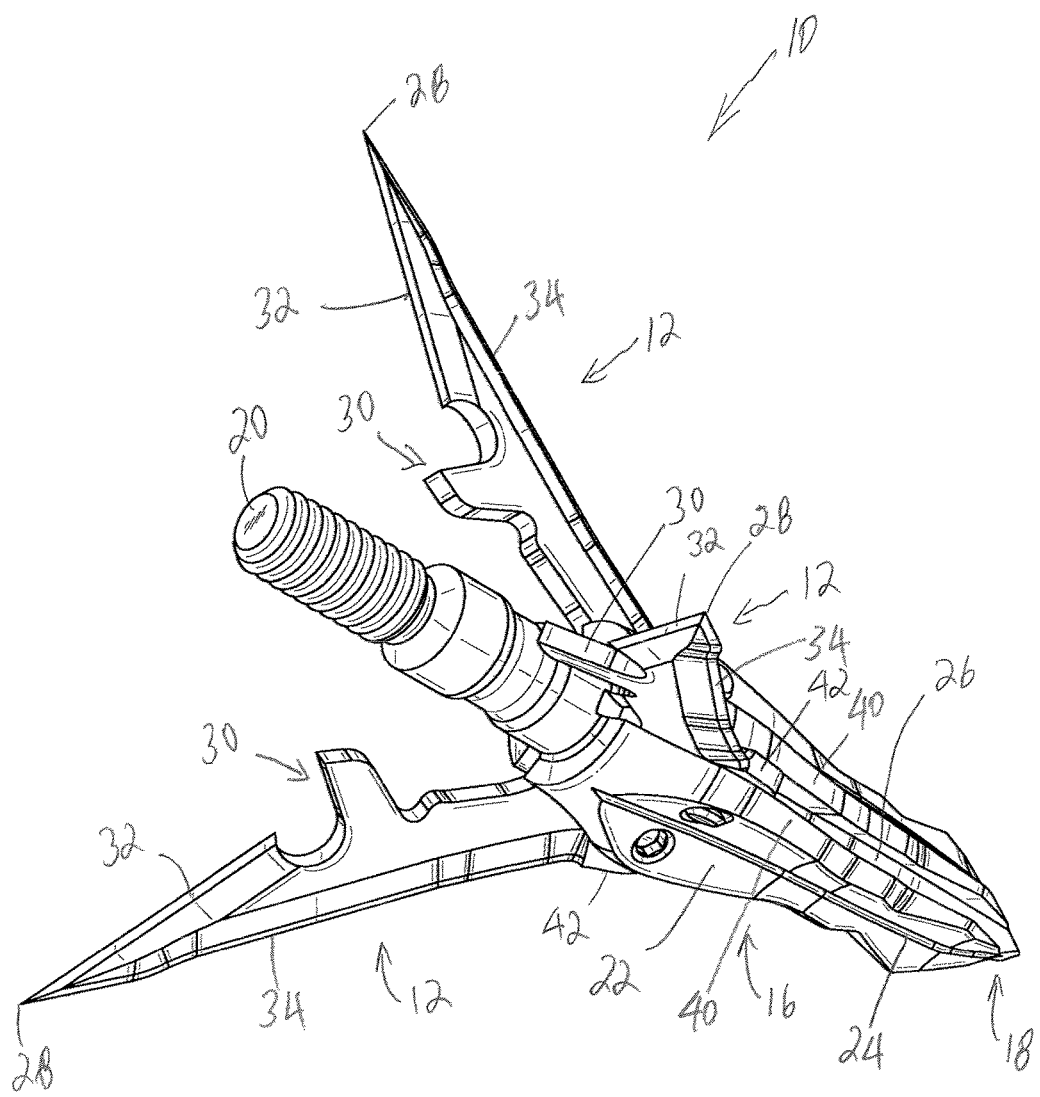
FIG. 4 is another perspective view of the broadhead of FIG. 1.
Figure 5:
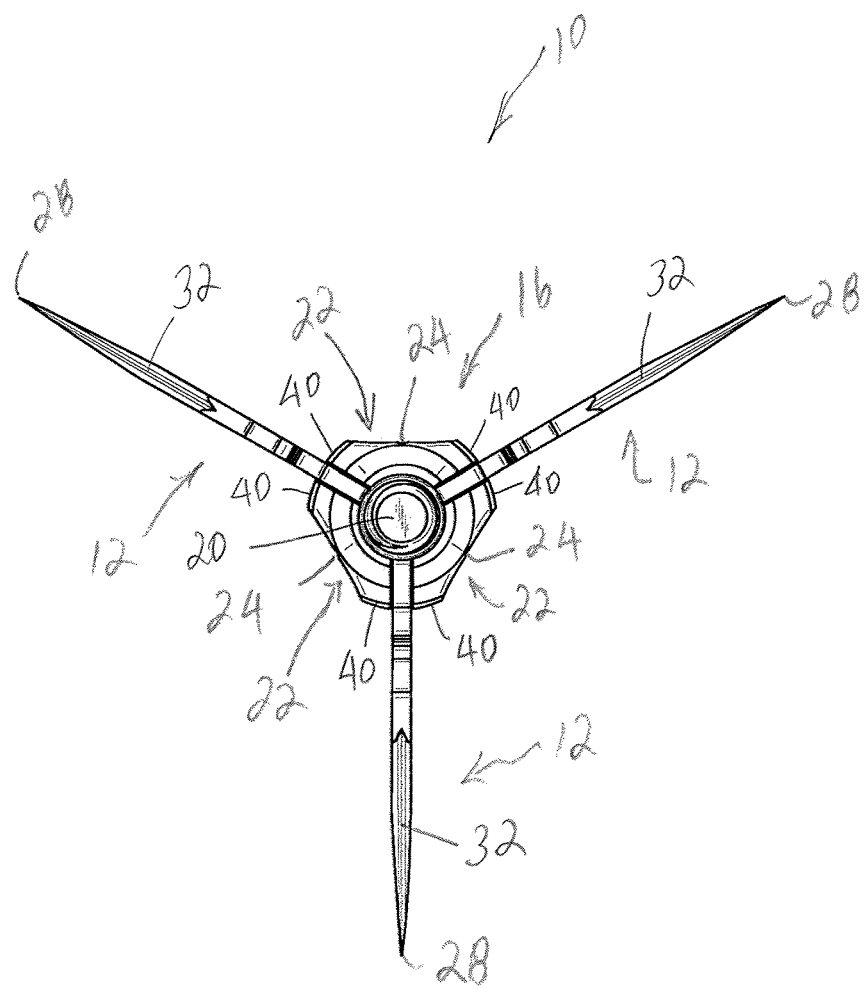
FIG. 5 is an elevation view of the broadhead of FIG. 1 as viewed from a proximal (rear) location.
Figure 6:
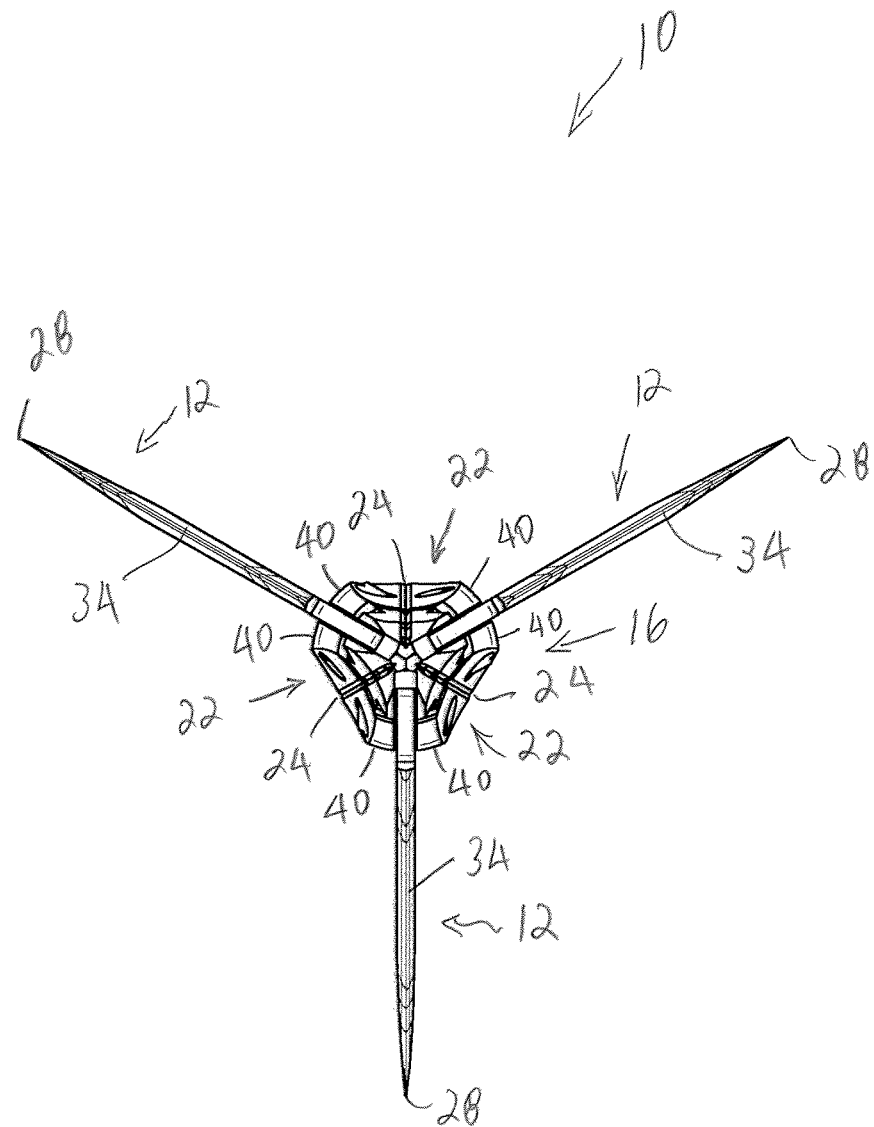
FIG. 6 is an elevation view of the broadhead of FIG. 1 as viewed from a distal (front) location.
Figure 7:
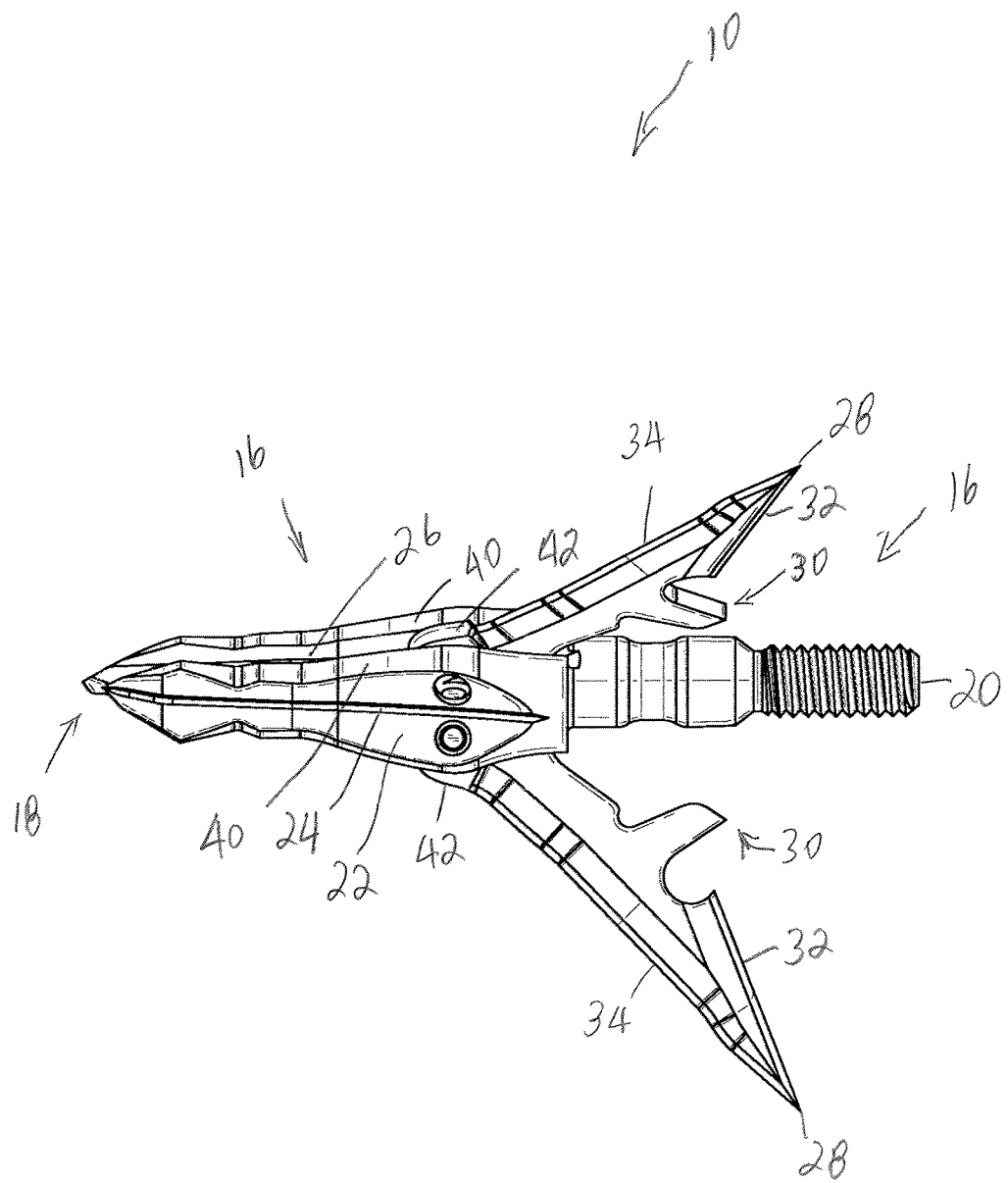
FIG. 7 is a plan view of the broadhead of FIG. 1.
Figure 8:
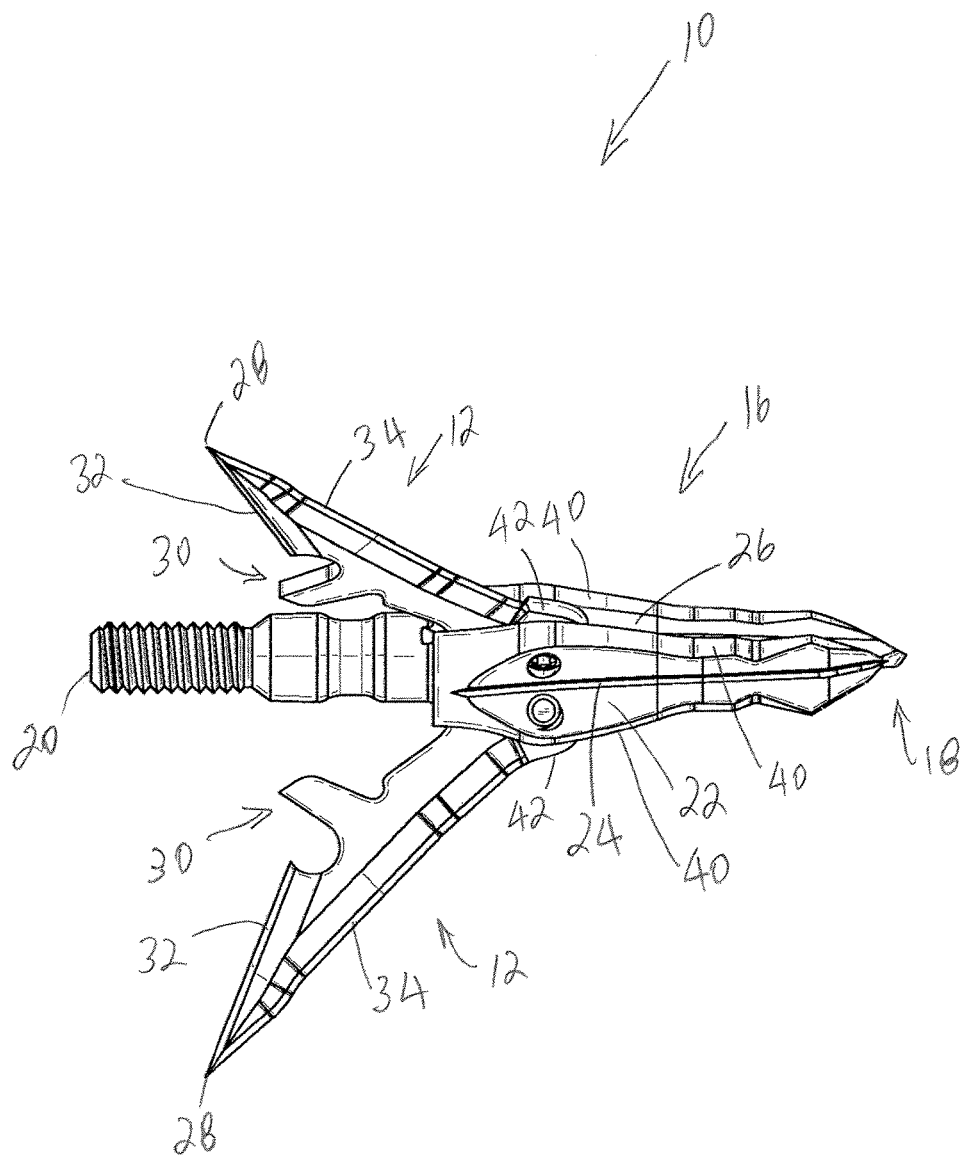
FIG. 8 is another plan view of the broadhead of FIG. 1.
Figure 9:
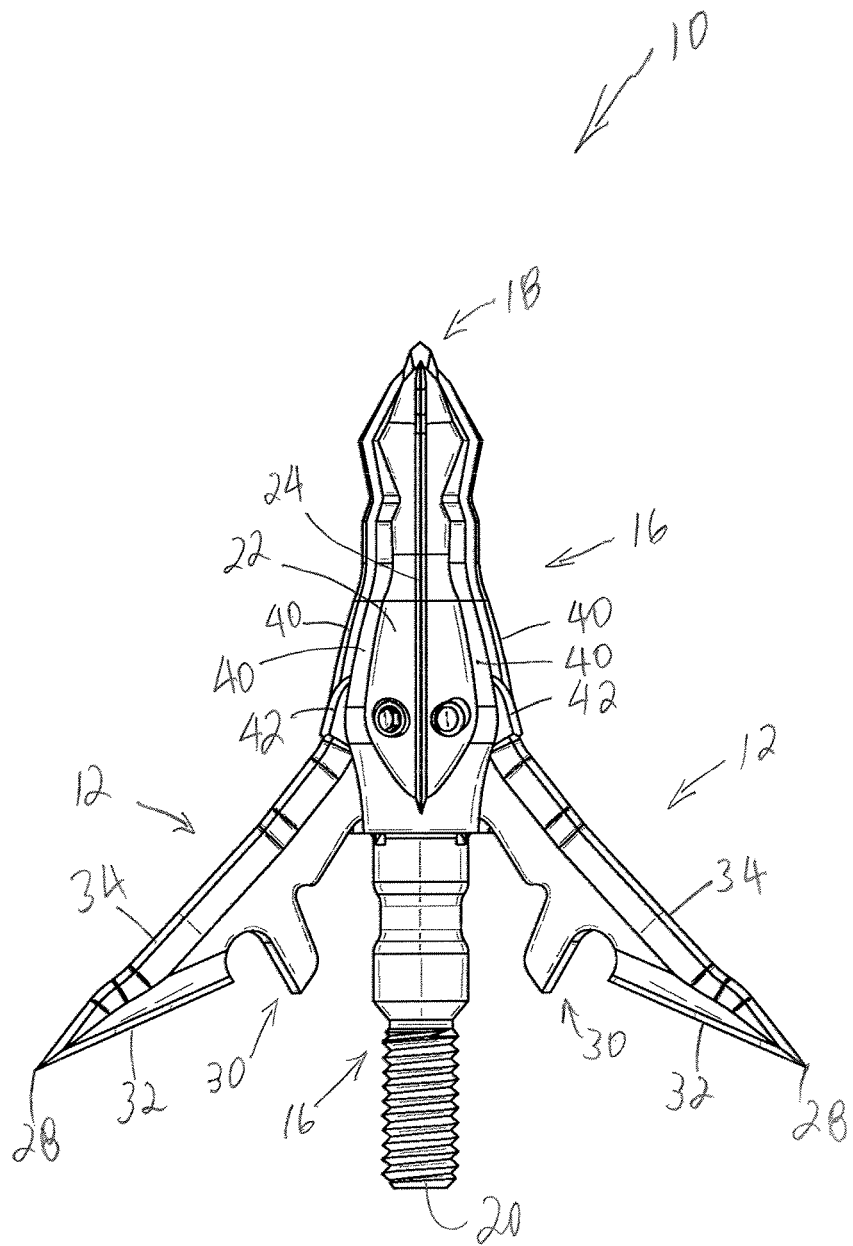
FIG. 9 is another plan view of the broadhead of FIG. 1.
Figure 10:
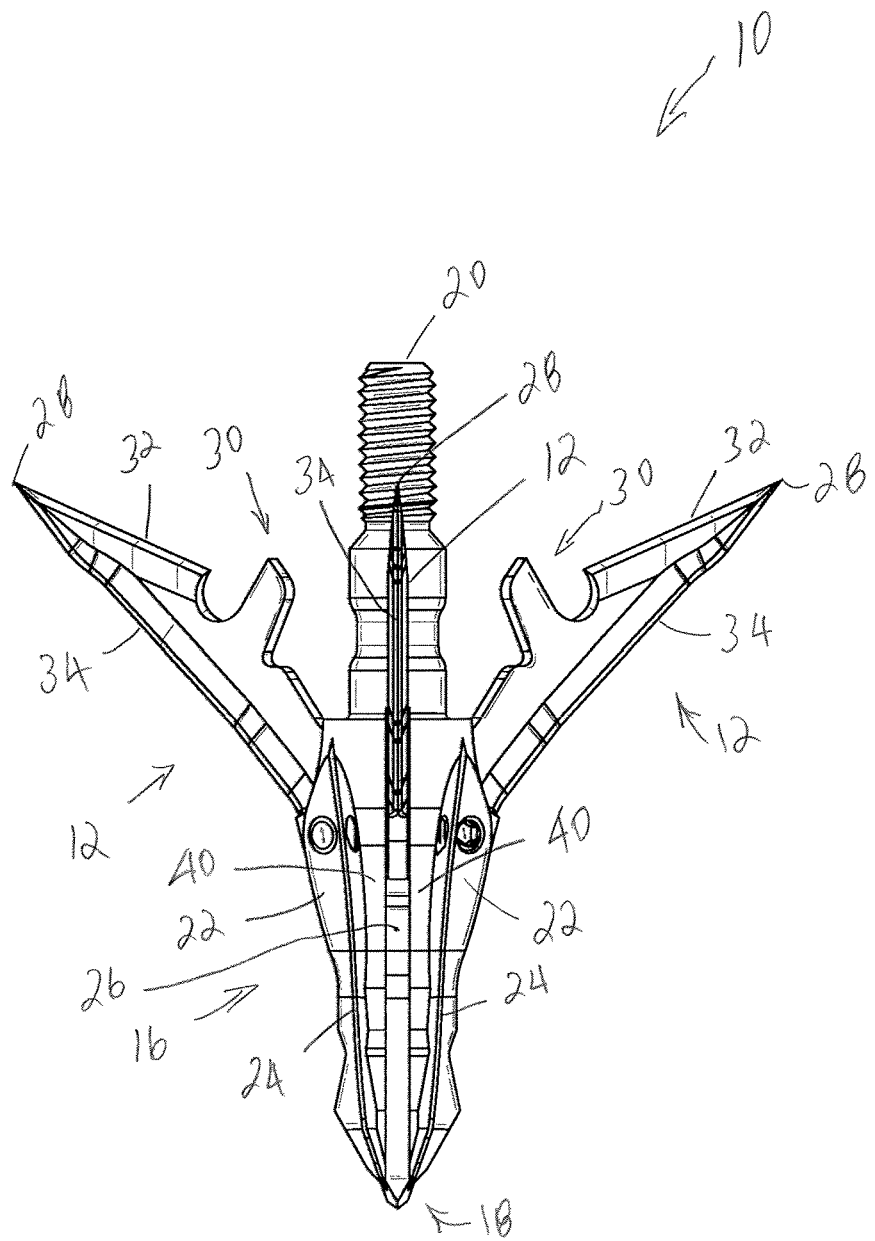
FIG. 10 is another plan view of the broadhead of FIG. 1.
Figure 11:
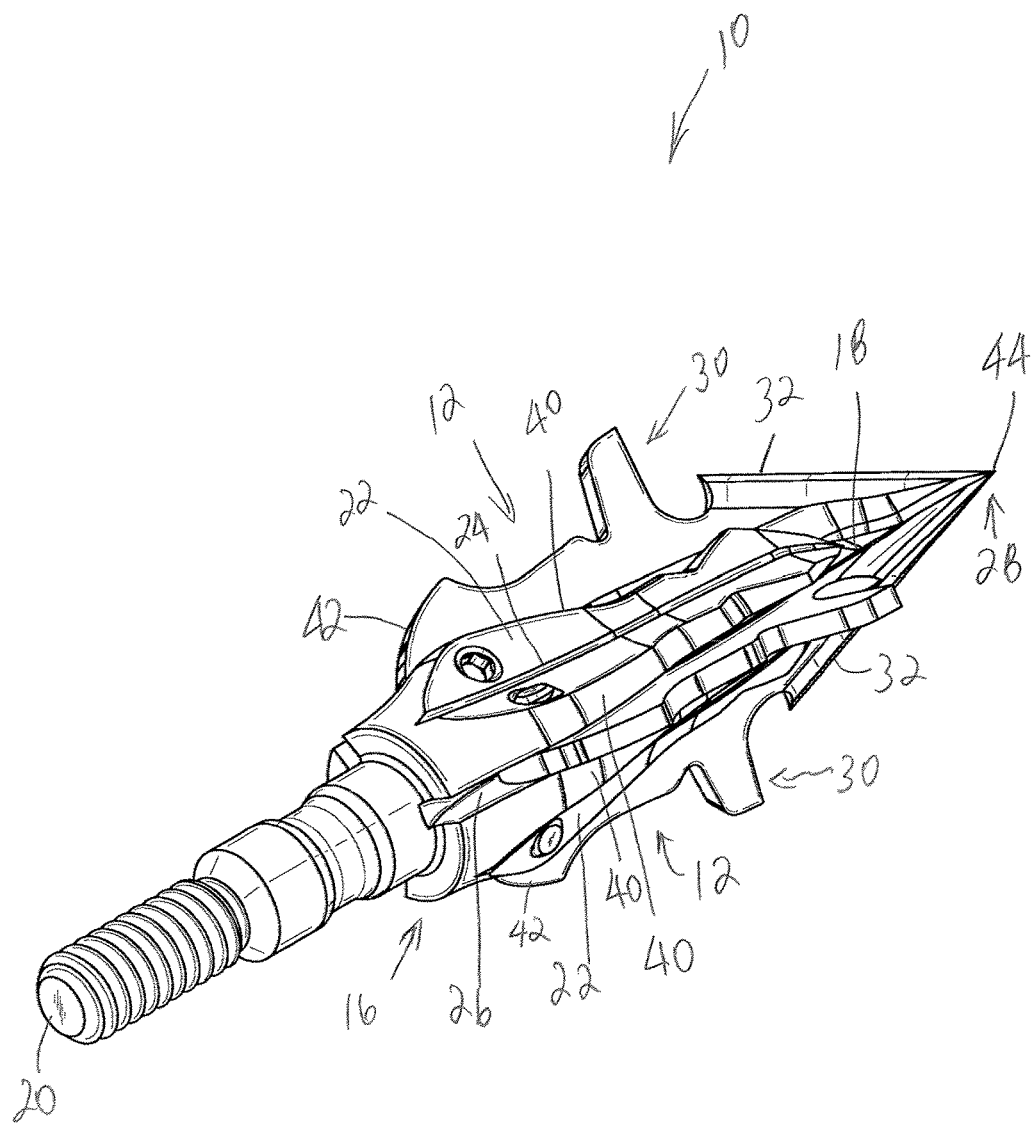
FIG. 11 is a perspective view of the broadhead of FIG. 1 illustrated with the plurality of blades in a fully retracted state.
Figure 12:
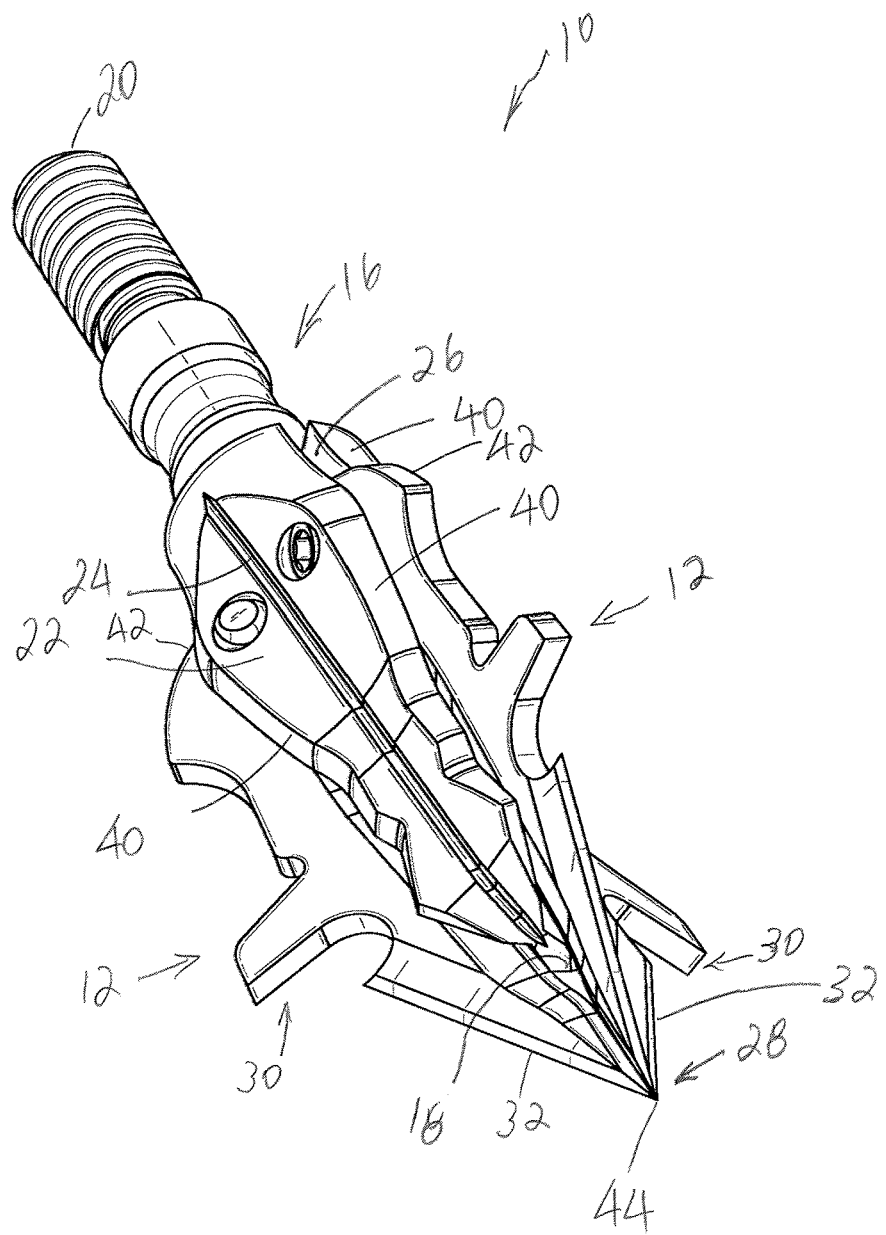
FIG. 12 is another perspective view of the broadhead of FIG. 11.
Figure 13:
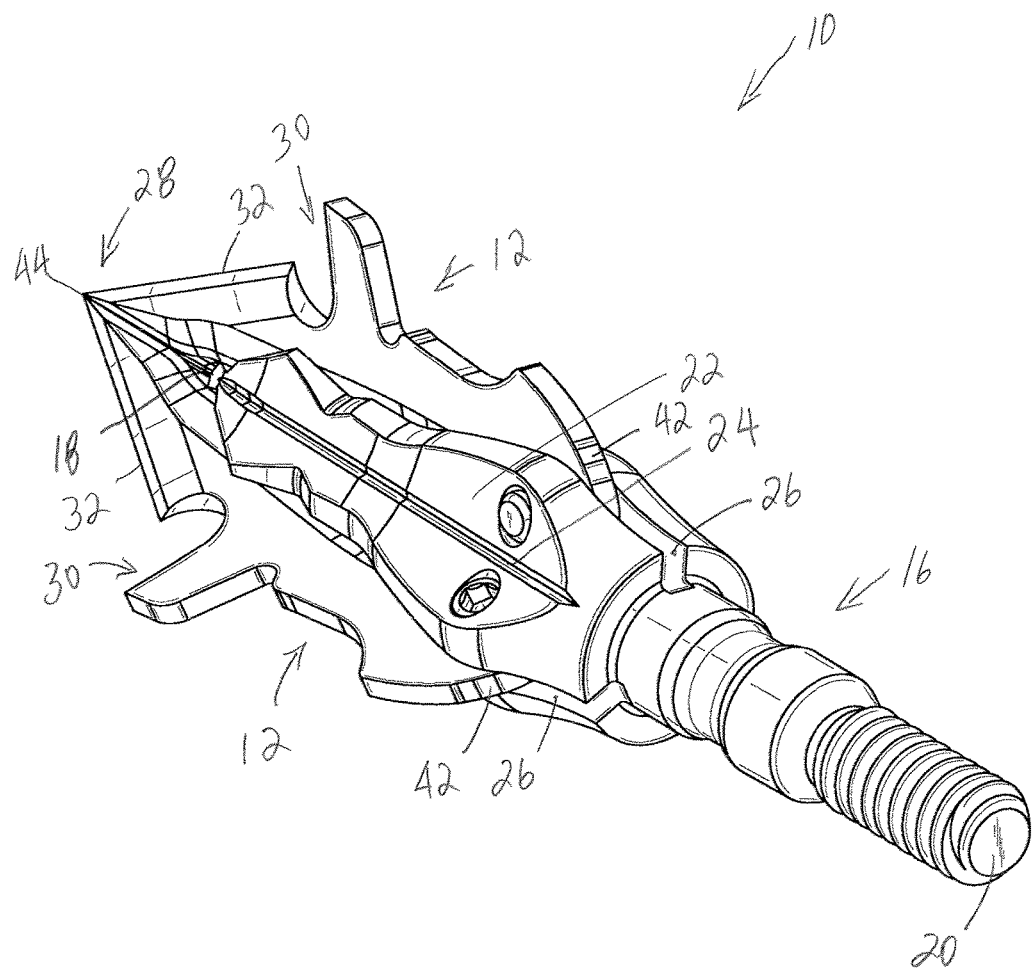
FIG. 13 is another perspective view of the broadhead of FIG. 11.
Figure 14:
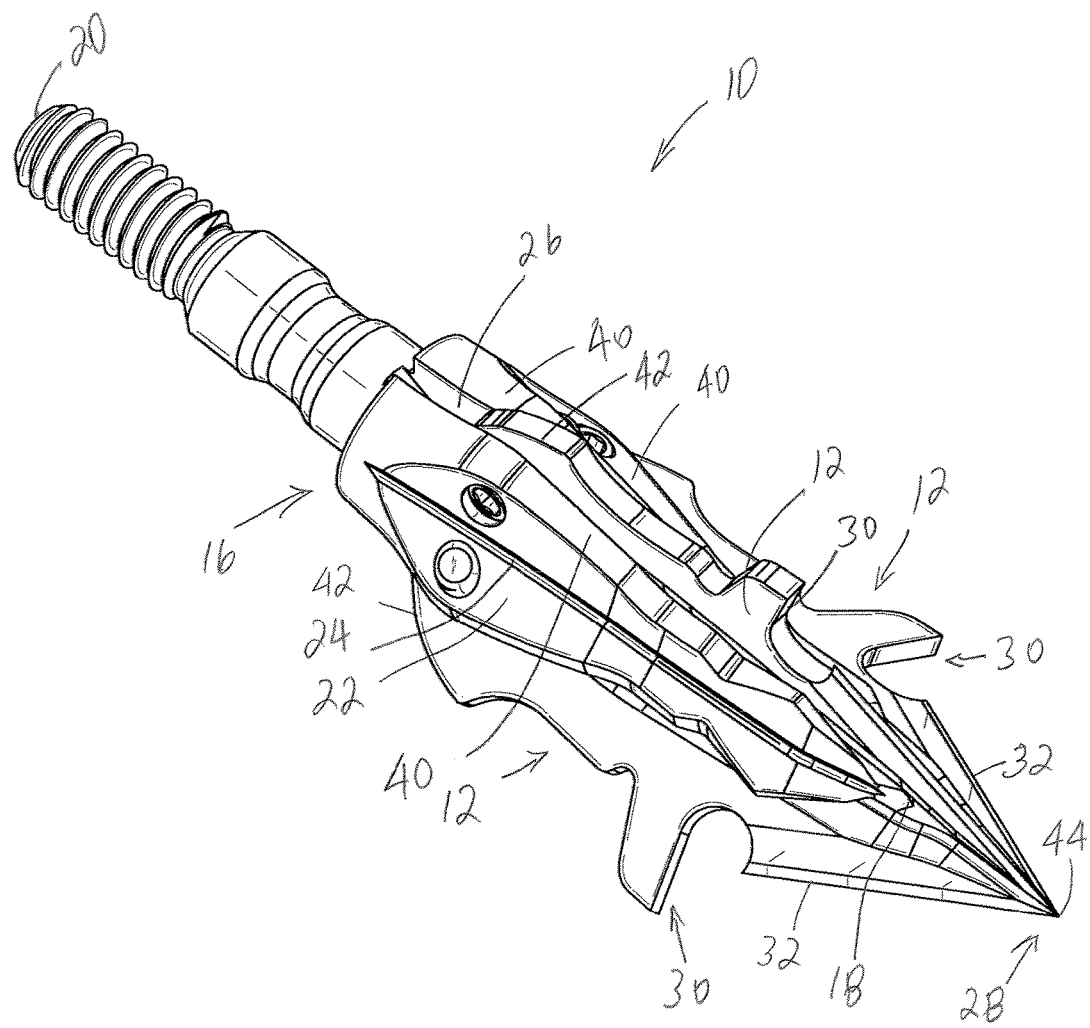
FIG. 14 is another perspective view of the broadhead of FIG. 11.

FIGS. 1-10 are various views of a non-limiting exemplary embodiment of a broadhead 10 of the instant disclosure illustrated with a plurality of blades 12 in a fully deployed configuration. FIGS. 1-4 are perspective views of the broadhead 10 as viewed from different vantage points. For instance, FIGS. 1 and 2 are front perspective views of the broadhead 10 as viewed from above and below. Likewise, FIGS. 3 and 4 are rear perspective views of the broadhead 10 as viewed from above and below. FIGS. 5 and 6, respectively, are the elevational views of the broadhead 10 as viewed from the rear and the front. FIGS. 7-10 are plan views of the broadhead 10 in different orientations about a longitudinal axis of the broadhead 10. For instance, FIGS. 7-9 illustrate the broadhead 10 in different orientations about the longitudinal axis such that only two of the plurality of blades 12 are viewable or visible with the other blade being "underneath" (or "hidden under") the broadhead 10. In contrast, FIG. 10 illustrates the broadhead 10 oriented about the longitudinal axis such that all of the plurality of blades 12 are visible or viewable when looking down along a plane of the blade 12 extending out of the paper.

Figure 15:
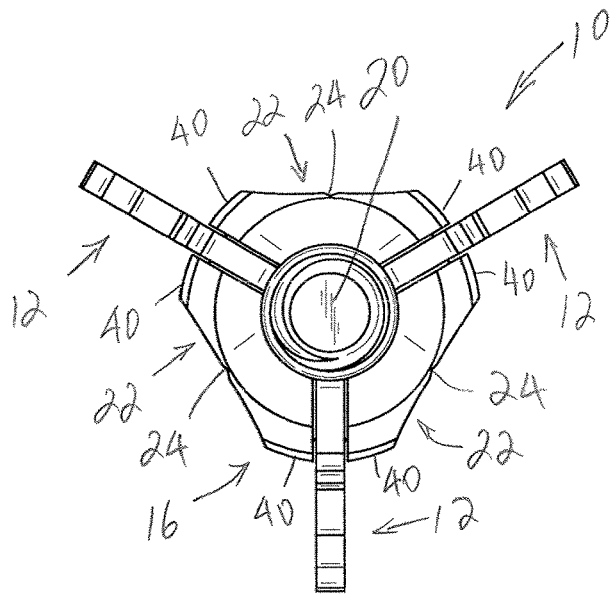
FIG. 15 is an elevation view of the broadhead of FIG. 11 as viewed from the proximal (rear) location.
Figure 16:
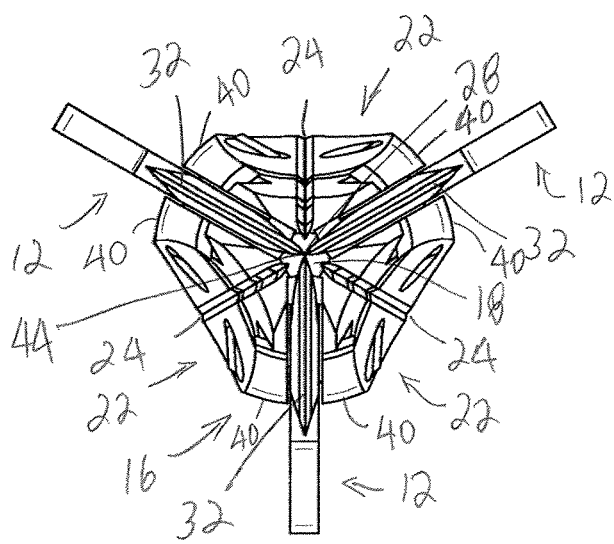
FIG. 16 is an elevation view of the broadhead of FIG. 11 as viewed from the distal (front) location.
Figure 17:
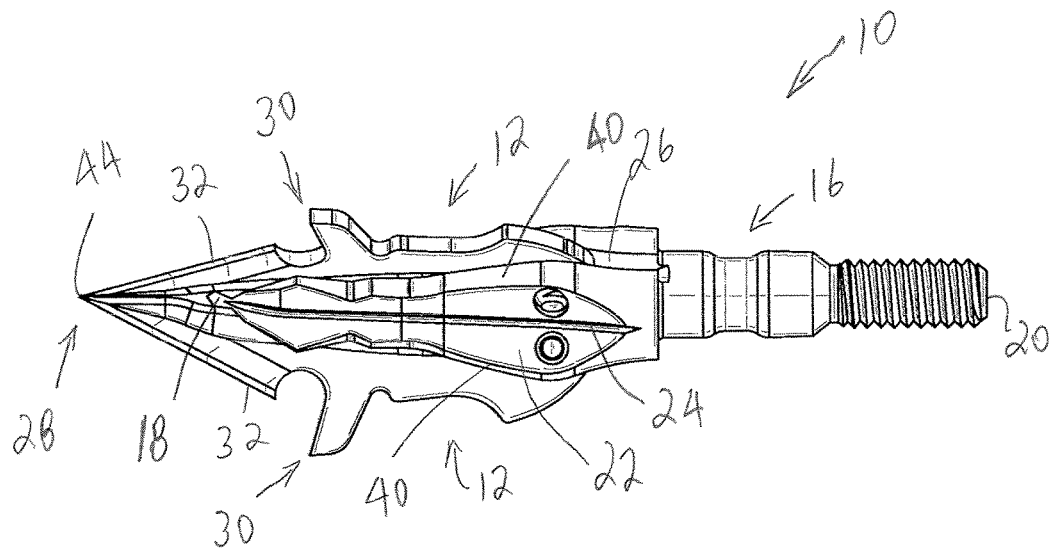
FIG. 17 is a plan view of the broadhead of FIG. 11.
Figure 18:
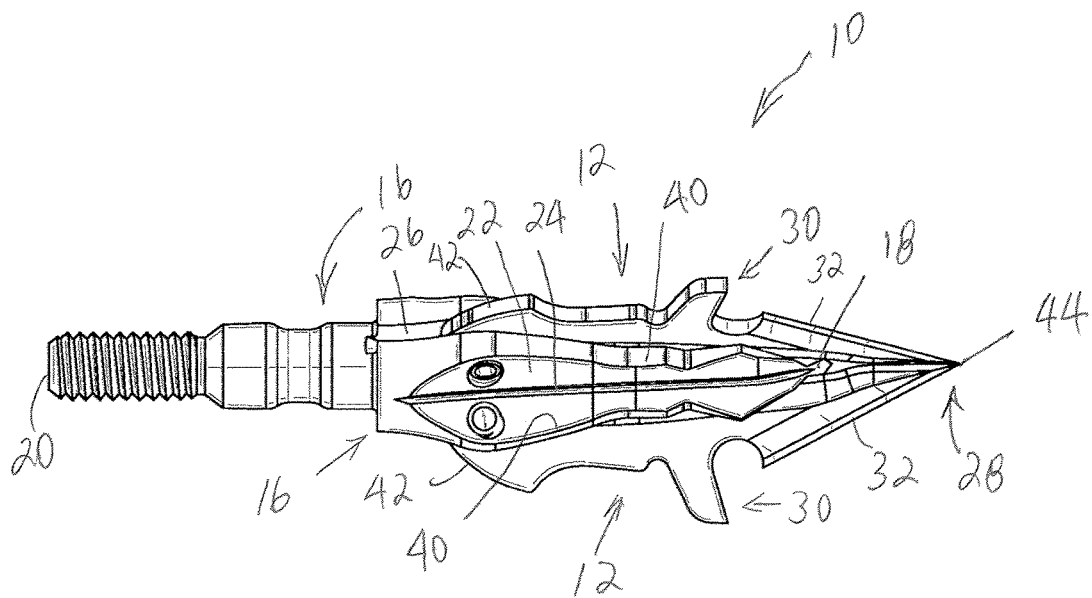
FIG. 18 is another plan view of the broadhead of FIG. 11.
Figure 19:
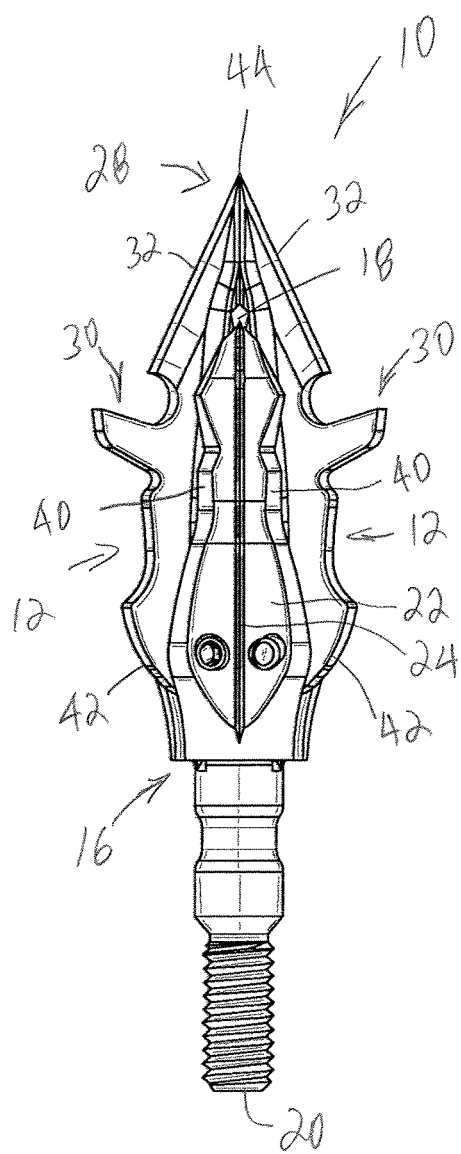
FIG. 19 is another plan view of the broadhead of FIG. 11.
Figure 20:
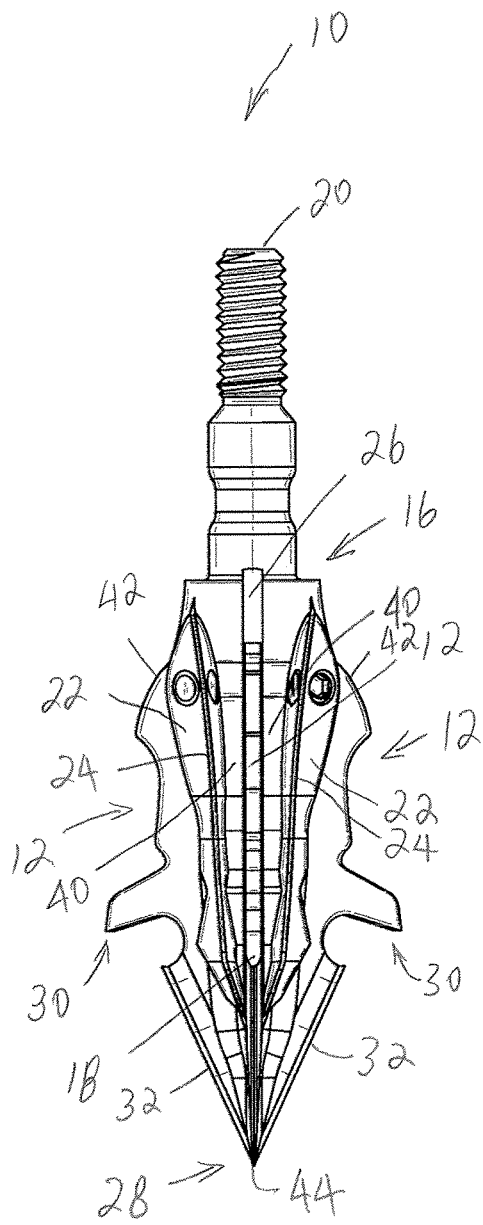
FIG. 20 is another plan view of the broadhead of FIG. 11.

FIGS. 11-20 are various views of the broadhead 10 illustrated with the plurality of blades 12 in a fully retracted configuration such as for example during flight. FIGS. 11-14 are perspective views of the broadhead 10 as viewed from different vantage points. FIGS. 15 and 16, respectively, are the elevational views of the broadhead 10 as viewed from the rear and the front. FIGS. 17-20 are plan views of the broadhead 10 in different orientations about the longitudinal axis of the broadhead 10.

Figure 21:
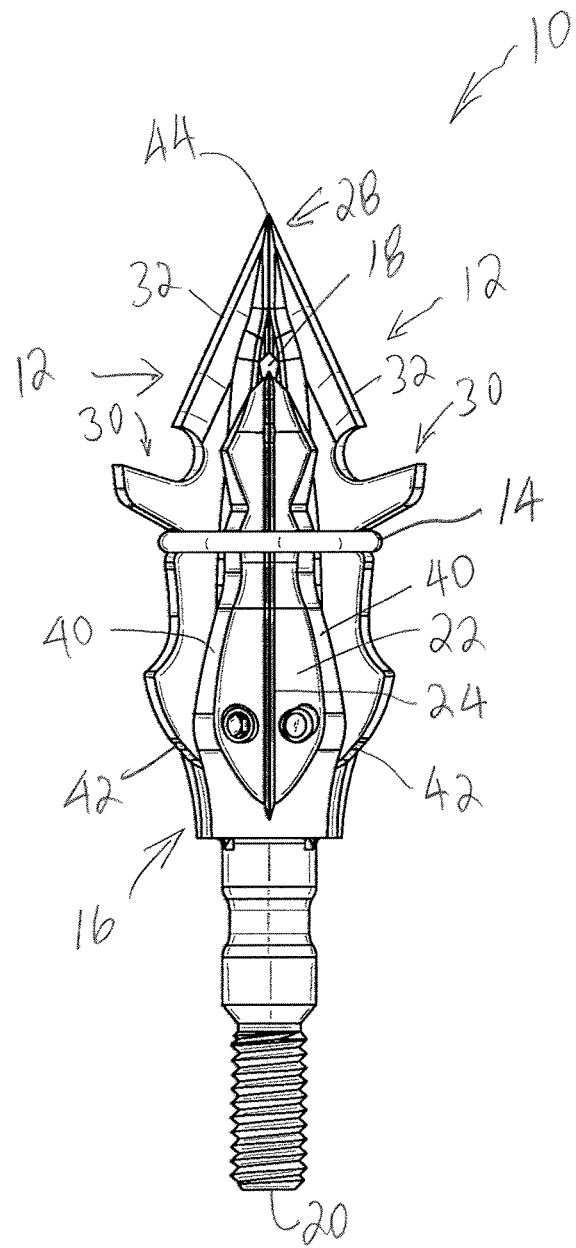
FIG. 21 is a plan view of the broadhead of FIG. 11 illustrated having a non-limiting exemplary embodiment of a frangible collar for retaining the blades in the fully retracted configuration.
Figure 22:
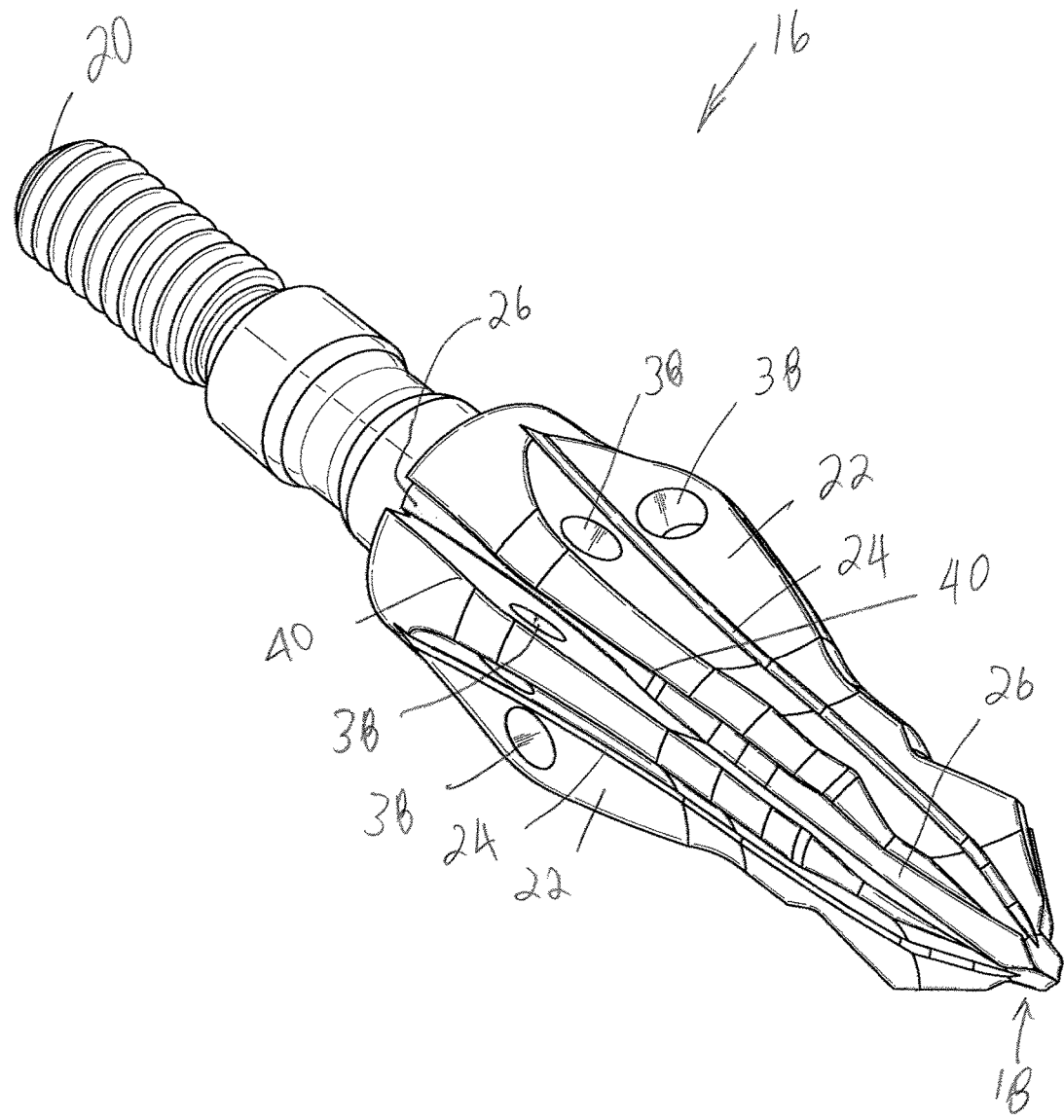
FIG. 22 is a perspective view of a non-limiting exemplary embodiment of a ferrule for the broadhead of FIG. 1.
Figure 23:
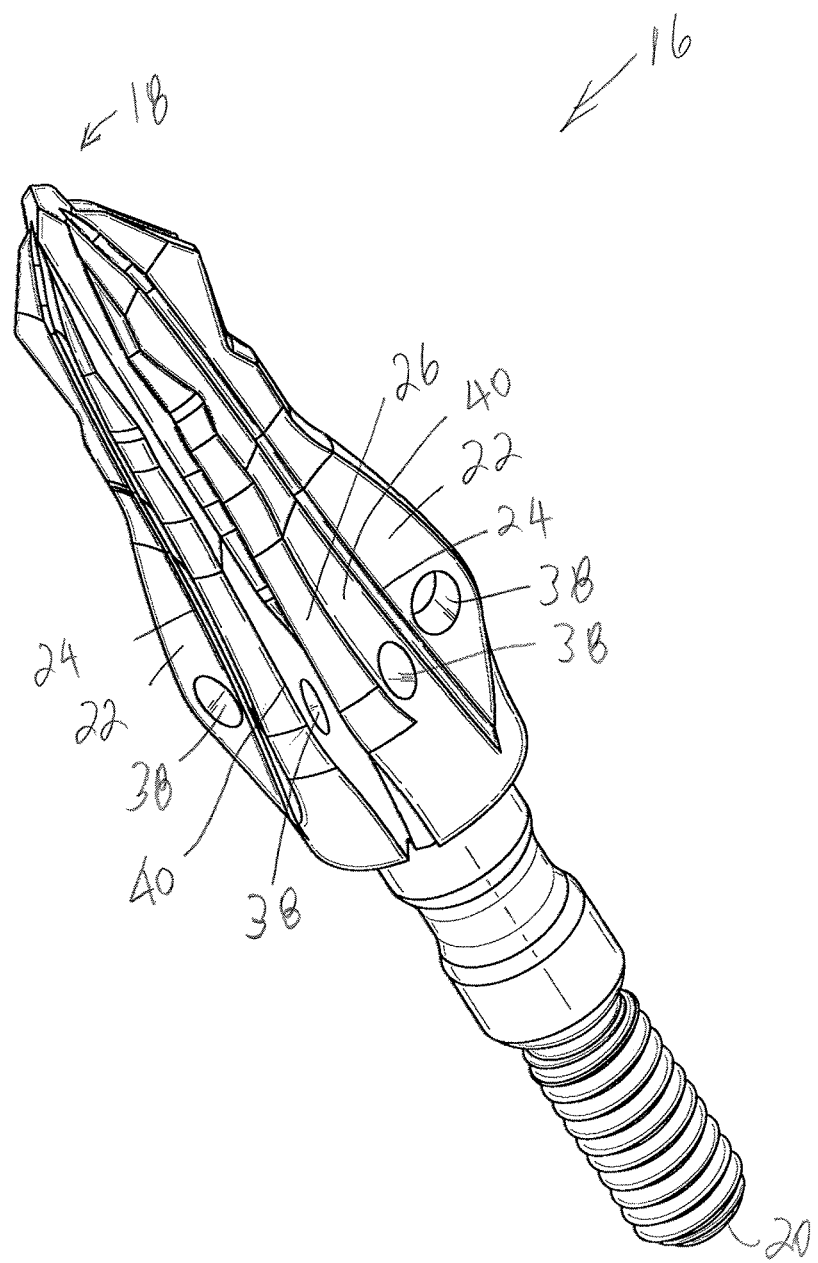
FIG. 23 is another perspective view of the ferrule of FIG. 22.
Figure 24:
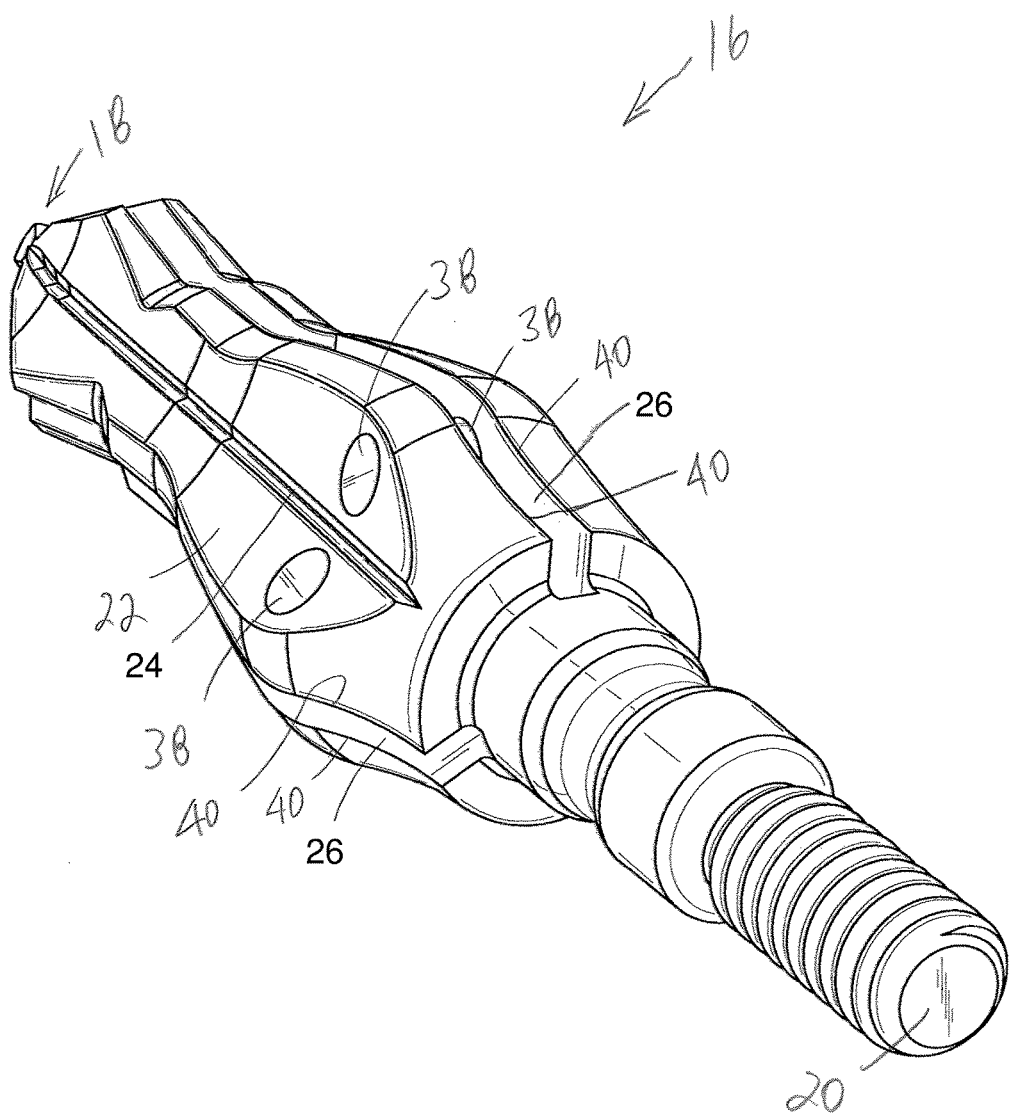
FIG. 24 is another perspective view of the ferrule of FIG. 22.
Figure 25:
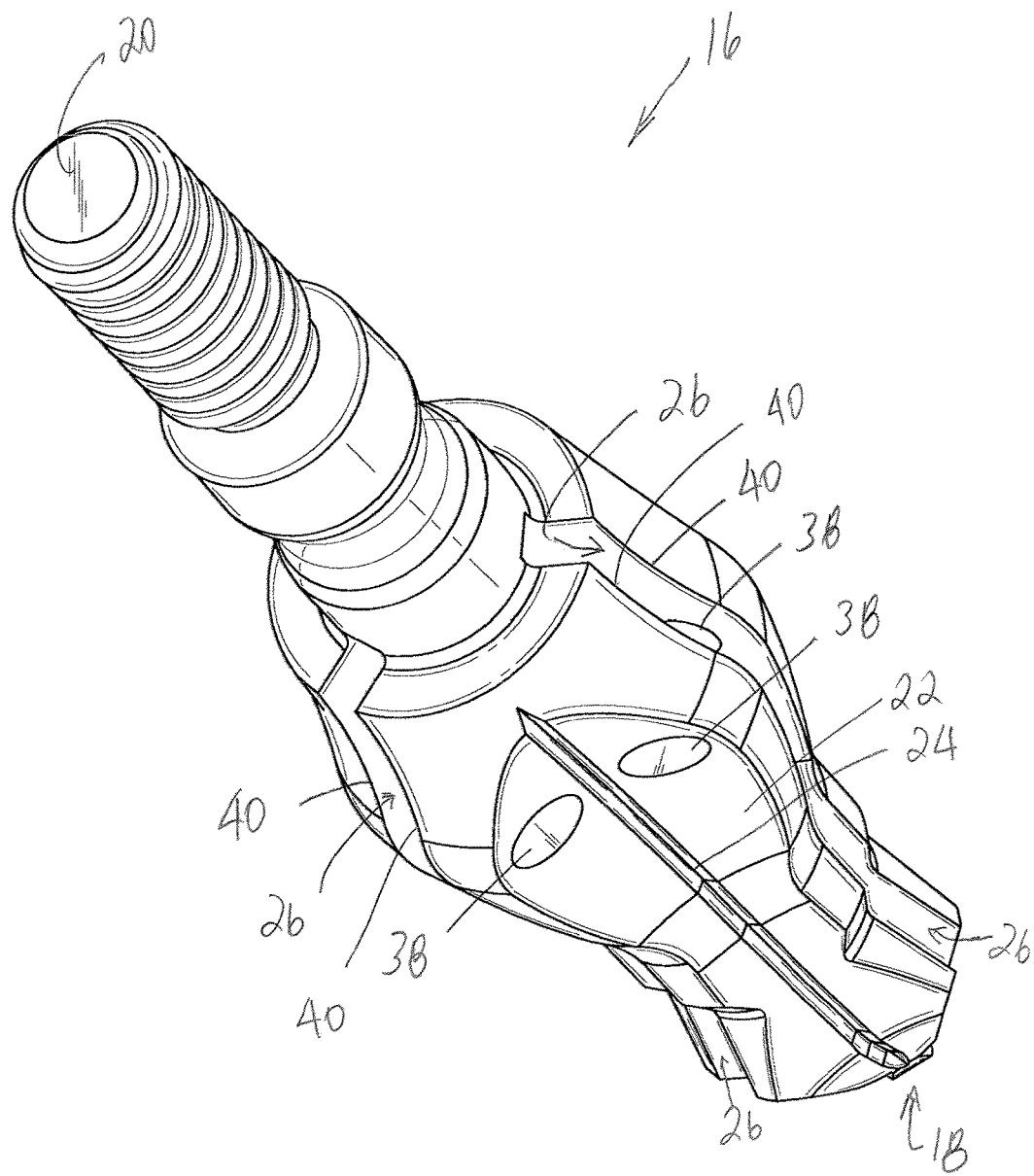
FIG. 25 is another perspective view of the ferrule of FIG. 22.

FIG. 21 illustrates the broadhead 10 of FIGS. 11-20 having a non-limiting exemplary embodiment of a frangible collar 14 encircling at least a portion of each of the plurality of blades 12. In some embodiments, as will be described in detail infra, the frangible collar 14 is configured for retaining the plurality of blades 12 in the retracted configuration such as for example during flight.

Figure 26:
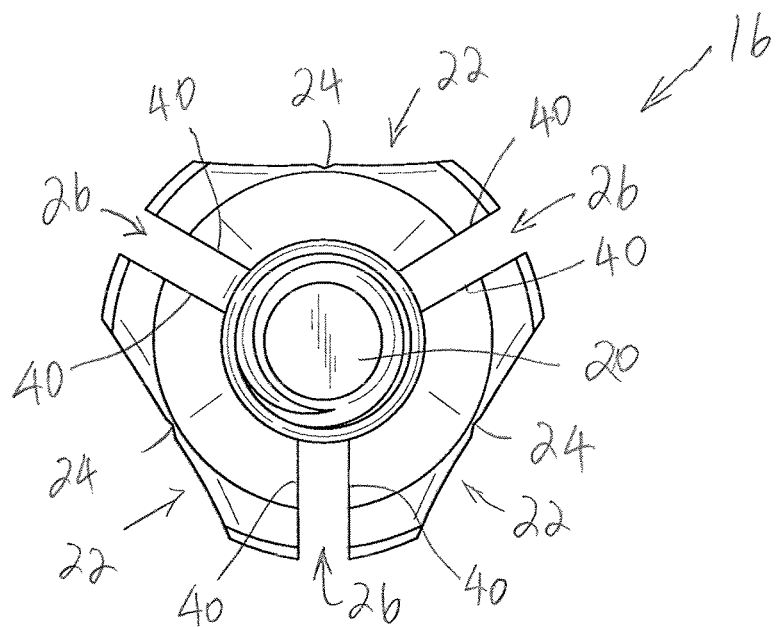
FIG. 26 is an elevation view of the ferrule of FIG. 22 as viewed from the proximal (rear) location.
Figure 27:
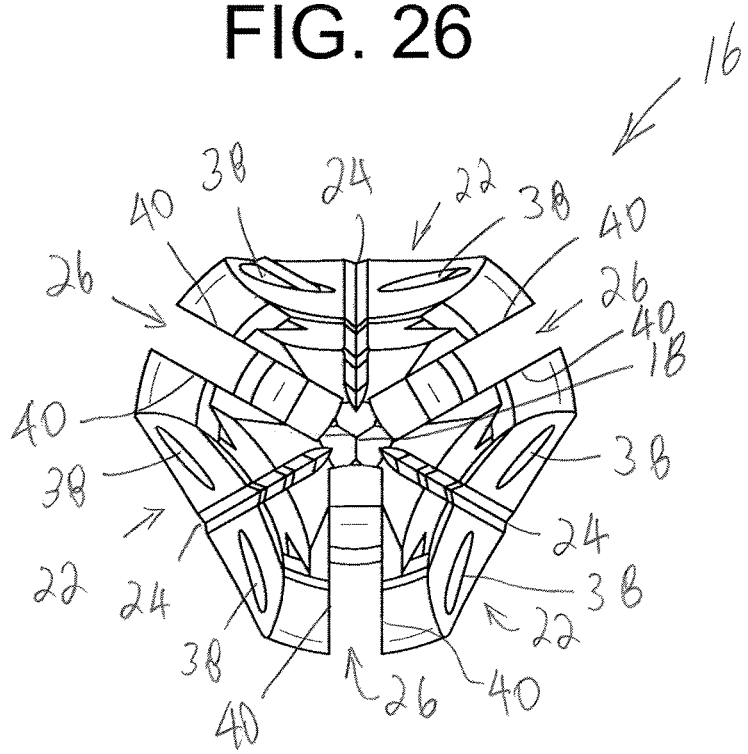
FIG. 27 is an elevation view of the ferrule of FIG. 22 as viewed from the distal (front) location.
Figure 28:
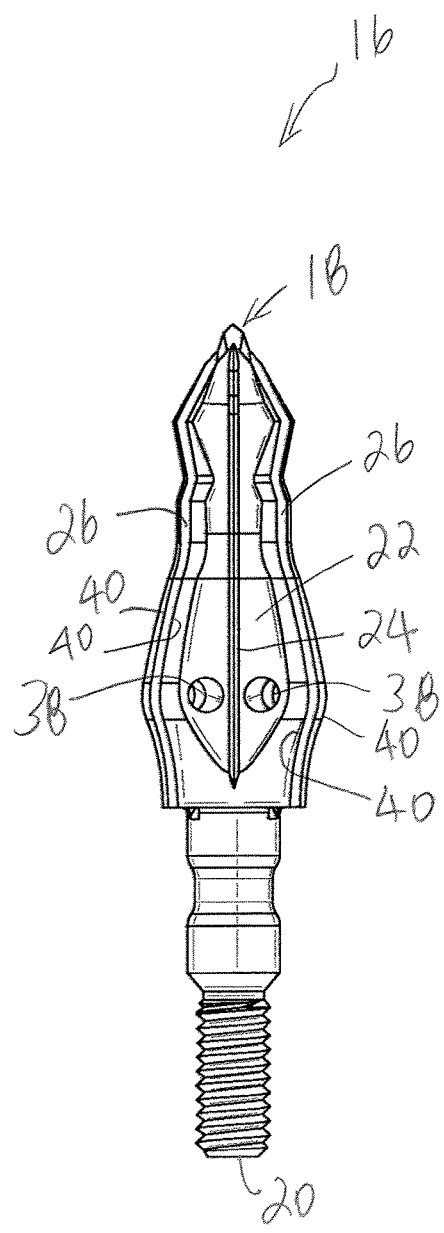
FIG. 28 is a plan view of the ferrule of FIG. 22.
Figure 29:
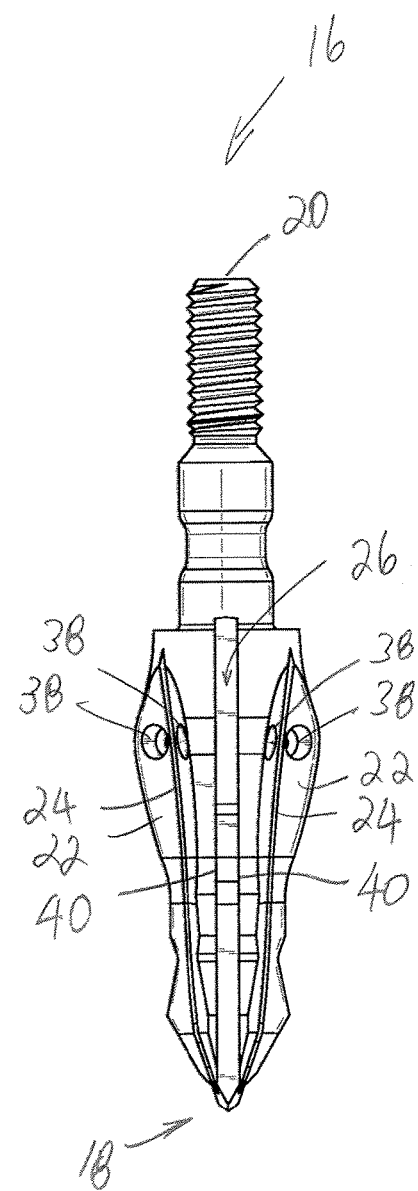
FIG. 29 is another plan view of the ferrule of FIG. 22.

FIGS. 22-29 illustrate various views of a non-limiting exemplary embodiment of a ferrule 16 for the broadhead 10. FIGS. 22-25 are perspective views of the ferrule 16 as viewed from different vantage points. FIGS. 26 and 27, respectively, are the elevational views of the ferrule 16 as viewed from the rear and the front. FIGS. 28 and 29 are plan views of the ferrule 16 in different orientations about a longitudinal axis of the ferrule 16 (i.e., about the longitudinal axis of the broadhead 10).

Figure 30:
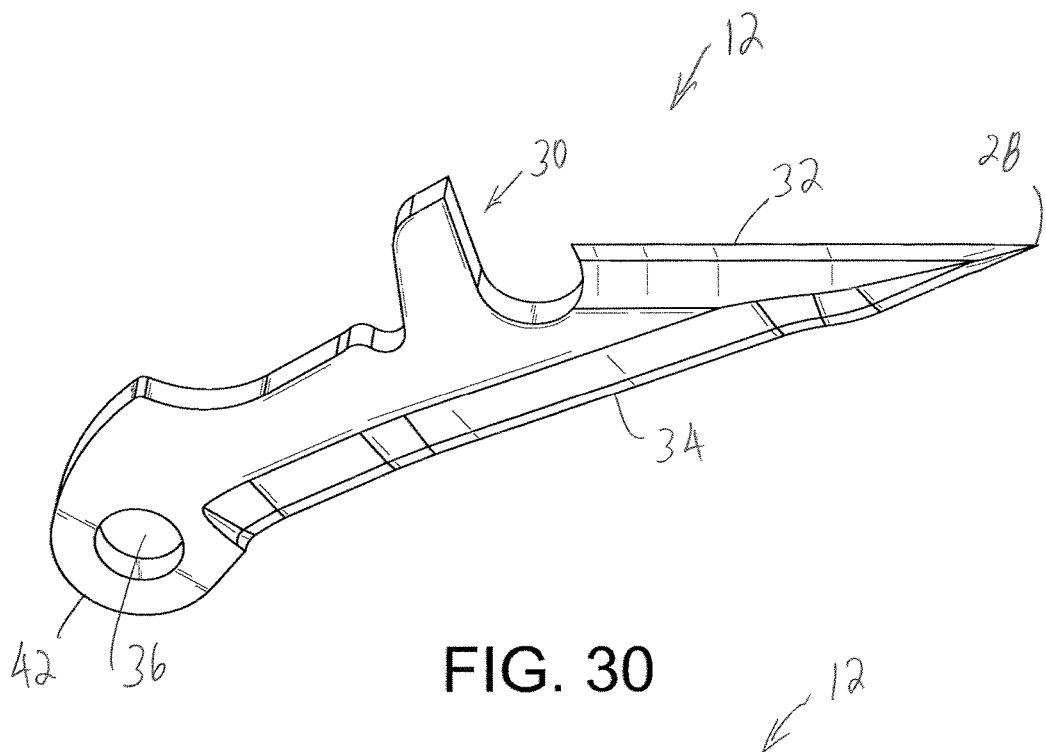
FIG. 30 is a perspective view of a non-limiting exemplary embodiment of a blade for the broadhead of FIG. 1.
Figure 31:
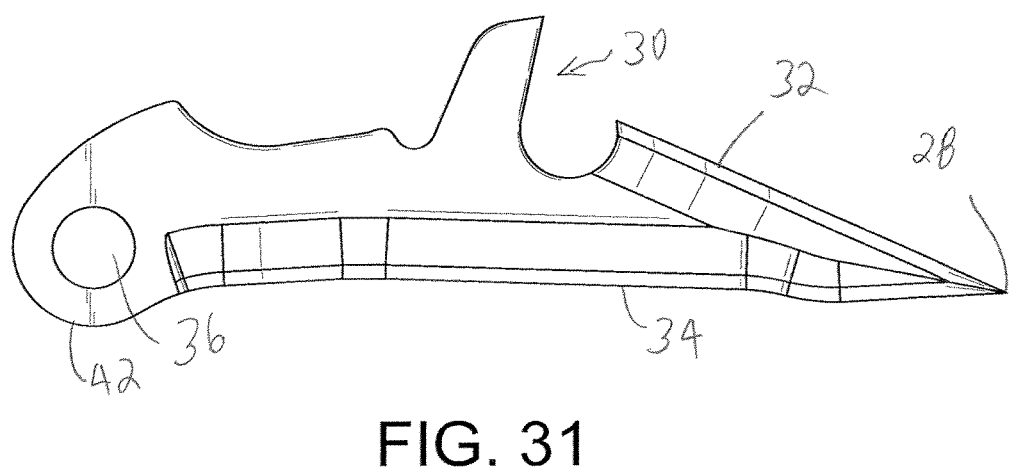
FIG. 31 is a plan view of the blade of FIG. 30.

FIGS. 30 and 31, respectively, are a perpective view and a plan view of a non-limiting exemplary embodiment of one of the plurality of blades 12 for the broadhead 10.

In a non-limiting exemplary embodiment, the broadhead 10 includes the plurality of blades 12 and the ferrule 16. The ferrule 16 includes a distal end 18 and a proximal end 20. In a non-limiting exemplary embodiment, the ferrule 16 includes a plurality of recesses 22 extending proximally from proximate the distal end 18. In some embodiments, the plurality of recesses 22 may extend along a portion of the longitudinal extent of the ferrule 16. In certain embodiments, the plurality of recesses 22 may extend along an entire longitudinal extent of the ferrule 16. In some embodiments, some of the plurality of recesses 22 may extend along a portion of the longitudinal extent of the ferrule 16 in combination with some of the plurality of recesses 22 extending along the entire longitudinal extent of the ferrule 16. In certain embodiments, one or more of the plurality of recesses 22 may include a channel 24.

In a non-limiting exemplary embodiment, the ferrule 16 includes a plurality of channels 26 extending proximally from proximate the distal end 18. In some embodiments, the plurality of channels 26 may extend along a portion of the longitudinal extent of the ferrule 16. In certain embodiments, the plurality of channels 26 may extend along an entire longitudinal extent of the ferrule 16. In some embodiments, some of the plurality of channels 26 may extend along a portion of the longitudinal extent of the ferrule 16 in combination with some of the plurality of channels 26 extending along the entire longitudinal extent of the ferrule 16. In certain embodiments, each channel of the plurality of channels 26 may be disposed between adjacent recesses of the plurality of recesses 22.

In a non-limiting exemplary embodiment, one or more of the plurality of recesses 22 may be configured for relieving fluid pressure that may be generated at the distal end 18 of the ferrule 16 as the broadhead 10 penetrates a target. In a non-limiting exemplary embodiment, one or more of the plurality of channels 26 may be configured for relieving fluid pressure that may be generated at the distal end 18 of the ferrule 16 as the broadhead 10 penetrates a target. In certain embodiments, one or more of the plurality of recesses 22 and one or more of the plurality of channels 26 may be configured for relieving fluid pressure that may be generated at the distal end 18 of the ferrule 16 as the broadhead 10 penetrates a target.

While the broadhead 10 of the instant disclosure is illustrated having three cutting blades 12 in a balanced or even distribution, i.e., 120 degrees apart from one another, around the ferrule 16, this should not be construed a requirement or a limitation. In some non-limiting exemplary embodiment, the broadhead 10 may have two cutting blades 12 disposed 180 degrees apart from each other on the ferrule 16. In certain non-limiting exemplary embodiment, the broadhead 10 may have more than three cutting blades 12 in a balanced even distribution around the ferrule 16. For instance, an exemplary broadhead may have four cutting blades 12 disposed 90 degrees apart from one another around the ferrule 16. As such, broadheads with two or more cutting blades 12 are considered as being within the metes and bounds of the instant disclosure.

In a non-limiting exemplary embodiment, each blade 12 of the plurality of blades includes a tip 28, an impact region 30, a first sharp cutting edge 32, a second sharp cutting edge 34, and an opening 36. In some embodiments, the first cutting edge 32 extends between the tip 28 and the impact region 30. However, this extent or size or length of the first cutting edge 32 should not be construed as a limitation or a requirement. In some embodiments, the first cutting edge 32 may extend only a portion of the distance between the tip 28 and the impact region 30. In certain embodiments, the second cutting edge 34 extends from the tip 28 to proximate the opening 36. However, this extent or size or length of the second cutting edge 34 should not be construed as a limitation or a requirement. In some embodiments, the second cutting edge 34 may extend only a portion of the distance between the tip 28 and the opening 36.

In a non-limiting exemplary embodiment, each channel of the plurality of channels 26 is configured for receiving or housing or accommodating and pivotally coupling with at least a portion of one of the plurality of blades 12. In some embodiments, each channel of the plurality of channels 26 includes openings 38 in opposing walls or sides 40. In certain embodiments, the section 42 of each blade 12 having the opening 36 is placed within one of the plurality of channels 26 between opposing walls 40. The openings 36 and 38 are aligned, and the blade 12 is pivotally coupled to the channel 26 with a fastener extending through the openings 36 and 38. The fastener can be a pivot pin or any other mechanism known in the art for pivotally coupling the blade 12 and the channel 26 such that the blade 12 is not hindered from rotation. Accordingly, in some embodiments, the second cutting edge 34 of the blade 12 extends from the tip 28 to a location proximate the channel 26 to which the blade 12 is coupled.

In a non-limiting exemplary embodiment, the frangible collar 14 is configured for retaining the plurality of blades 12 in the fully retracted position or state or configuration. Accordingly, in some embodiments, each channel of the plurality of channels 26 is configured for receiving or accommodating or housing at least a portion of the second cutting edge 34 while the blade 12 is in the fully retracted, i.e., un-deployed, state. In certain embodiments, for minimizing dulling of the sharp cutting edge 34, each blade 12 and/or each channel 26 are/is configured or designed to ensure minimal contact between the second cutting edge 34 and the bottom of the corresponding channel 26. In some embodiments, the tips 28 of each of the plurality of blades 12 converge or almost converge to form a distal tip 44 of the broadhead 10. In certain embodiments, the distal tip 44 of the broadhead 10 is a chisel tip having cutting edges defined at least in part by the first cutting edge 32 of each blade 12. In some embodiments, the plurality of blades 12 are configured such that the distal (or chisel) tip 44 of the broadhead 10 is formed distally or in front of or beyond the distal end 18 of the ferrule 16. In certain embodiments, the plurality of blades 12 are configured such that the distal (or chisel) tip 44 of the broadhead 10 is formed at or is proximate or on the same plane as the distal end 18 of the ferrule 16. Other configurations for forming the distal tip 44 as a chisel tip with sharp cutting edges that may become apparent to one skilled in the art are considered as being within the metes and bounds of the instant disclosure.

It will be apparent to one skilled in the art that the frangible collar 14 functions or operates to at least form the distal chisel tip 44 with cutting edges defined at least in part by the first cutting edge 32 of each of the plurality of blades 12. The frangible collar 14 functions as such during flight, i.e., before the broadhead 10 impacts a target, and also momentarily after the broadhead 10 impacts the target. As is well known to those skilled in the art, the arrow or bolt, and the broadhead or tip at the distal end thereof, rotates or spins about its longitudinal axis at a relatively high angular velocity after it has been discharged from a bow or crossbow and is in flight towards the target. In a non-limiting exemplary embodiment, when the distal chisel tip 44 touches the target, the spinning or rotating cutting edges of the distal chisel tip 44, i.e., the first cutting edges 32 of the blades 12, create a bore and the distal chisel tip 44 of the broadhead 10 bores into the target. As the broadhead 10, with the fully retracted blades 12 spinning, penetrates the target, a force is exerted by the target onto the impact region 30 in the proximal direction. The force causes the blades 12 to rotate outward away from the ferrule 16, and the outward rotation of the blades 12 causes the frangible collar 14 to disintegrate (i.e., shatter or break). As the blades 12 continue to rotate outwards, the second cutting edge 34 of each blade 12 is exposed out of the corresponding channel 26 in the direction away from the ferrule 16. The first cutting edges 32 continue to widen and lengthen the bore as the broadhead 10 continues to penetrate the target and the blades 12, and more particularly the second cutting edges 34, continue rotating outwards away from the ferrule 16. In a non-limiting exemplary embodiment, the blades 12 are configured such that when the second cutting edges 34 are sufficiently exposed, the target starts exerting the force onto the exposed second cutting edges 34 in the proximal direction until the blades 12 are fully extended or deployed into a swept-back configuration exposing the entirety of the second cutting edges 34. The second cutting edges 34 of the blades 12 act to cut into the target and widen and lengthen the bore as the broadhead 10 continues to bore or penetrate into the target until the broadhead 10 stops rotating or spinning.

In a non-limiting exemplary embodiment, the frangible collar 14 is an O-ring or a rubber band. Other forms and/or configuration of frangible collars as are well-known in the art are considered as being within the metes and bounds of the instant disclosure.

In a non-limiting exemplary embodiment, the distal end 18 of the ferrule 16 is configured as a chisel tip or a multi-faceted tip or a trocar tip having a plurality of facets and sharp cutting edges disposed between adjacent facets such as those disclosed at least in applicant's co-owned U.S. Pat. Nos. 9,410,778, 9,404,722, 8,986,141, 7,771,298, 7,182,706, 7,011,589, 6,942,588, 6,669,586, 6,626,776, 6,554,727, 6,517,454, among others, and in International Publication No. WO 2018/075356, among others, all of which are herein incorporated by reference in their entirety. As disclosed in one or more of these patents and/or publications, the distal end 18, in some embodiments, is formed as an integral part of the ferrule 16. Also as disclosed in one or more of these patents and/or publications, the distal end 18, in some embodiments, is a discrete component attached to the ferrule 16.

In a non-limiting exemplary embodiment, the proximal end 20 of the ferrule 16 is configured for attaching the broadhead 10 to a shaft of an arrow or a bolt. While the figures of the instant disclosure might imply that the proximal end 20 is threaded, this should not be construed as limiting. In some embodiments, the proximal end 20 may be an un-threaded shaft or cylinder. Other forms and/or configurations for attaching or coupling a broadhead to the shaft of an arrow or bolt, as are well known in the art, are considered as being within the metes and bounds of the instant disclosure.

It will be readily apparent that as the blades 12 rotate from the fully retracted in-flight configuration to the fully extended swept-back configuration, the blades 12 traverse a plane substantially orthogonal to the longitudinal axis of the broadhead 12 (or the ferrule 16). Consequently, the tip 28 of each blade 12 traverses an arc having a center at the location whereat the blade 12 is coupled to the corresponding channel 26.

Figure 32A:
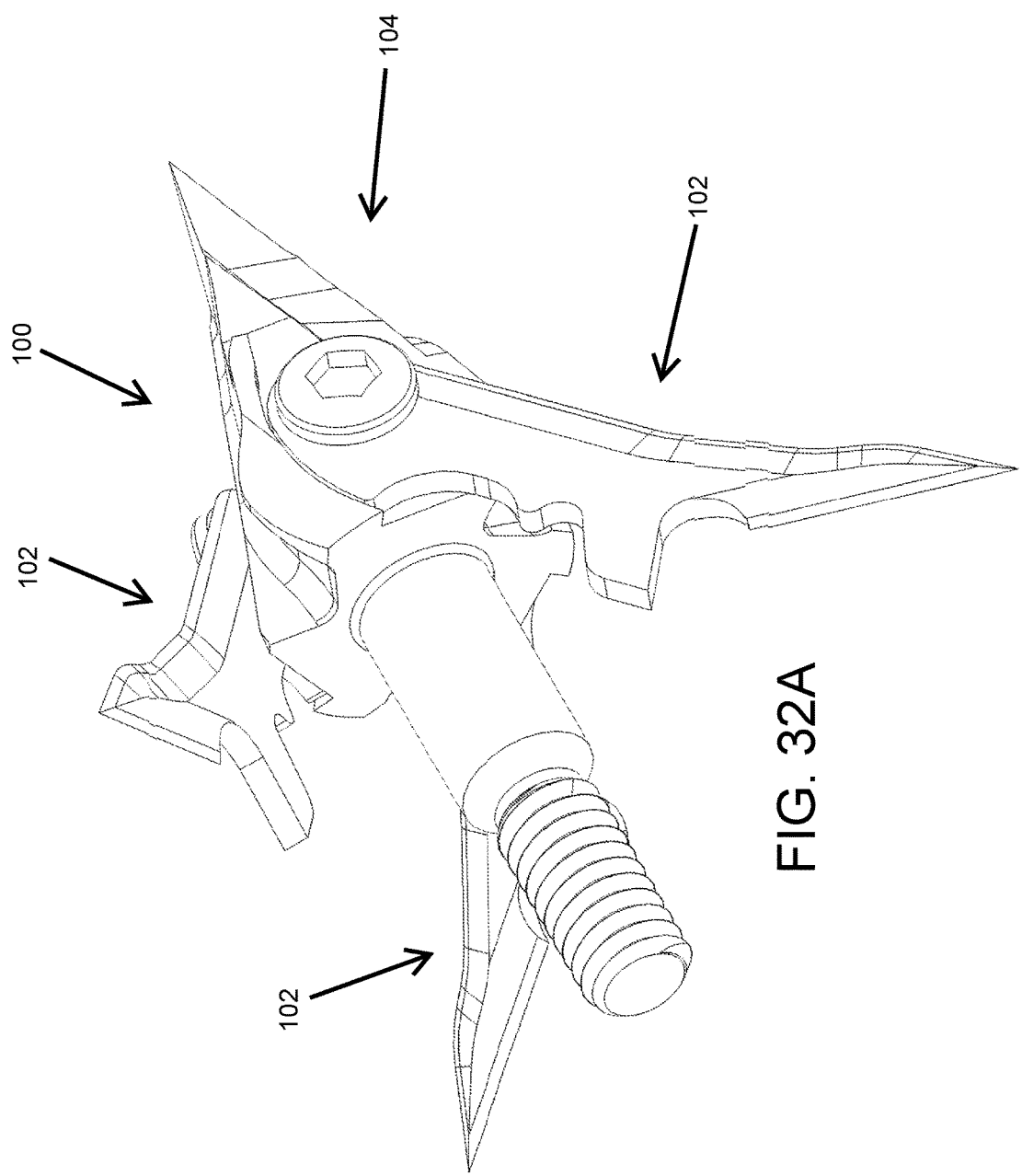
FIG. 32A is a perspective view of a non-limiting exemplary embodiment of another broadhead of the instant disclosure illustrated with a plurality of blades in a fully deployed state.

FIGS. 32A-32C illustrate a non-limiting exemplary embodiment of another broadhead 100 of the instant disclosure having a plurality of blades 102 pivotally coupled or attached to a ferrule 104 such that the blades 102 deploy at an angle to the longitudinal axis of the ferrule 104. FIG. 32A is a perspective view of the broadhead 100 illustrated with the plurality of blades 102 in a fully deployed state; FIG. 32B is a perspective view of the broadhead 100 illustrated with the plurality of blades 102 in a fully retracted state; and FIG. 32C is an elevation or end view of the broadhead 100 of FIG. 3A as viewed from a proximal end of the ferrule 104.

In view thereof, modified and/or alternate configurations of the embodiments described herein may become apparent or obvious to one of ordinary skill. All such variations are considered as being within the metes and bounds of the instant disclosure. For instance, while reference may have been made to particular feature(s) and/or function(s), the disclosure is considered to also encompass any and all equivalents providing functionalities similar to those disclosed herein with reference to the accompanying drawings. Accordingly, the spirit, scope and intent of the instant disclosure is to embrace all such variations. Consequently, the metes and bounds of the instant disclosure are defined by the appended claims and any and all equivalents thereof.

What is claimed is:

1. A broadhead, comprising:
    a ferrule comprising:
        a distal end;
        a proximal end;
        a plurality of recesses extending proximally from proximate the distal end; and
        a plurality of channels extending proximally from proximate the distal end, wherein each channel is disposed between adjacent recesses; and
    a plurality of deployable blades, wherein at least a portion of each blade is disposed within and is pivotally coupled to one of the plurality of channels, each blade comprising:
        a tip;
        an impact region;
        a first cutting edge extending from the tip to proximate the impact region; and
        a second cutting edge extending from the tip to proximate the channel to which the blade is pivotally coupled;
    wherein, during flight
        at least a portion of the second edge of each blade is retained within at least a portion of the channel to which the blade is pivotally coupled; and
        the tips of each blade converge to form a chisel tip comprising cutting edges defined at least in part by the first cutting edge of each blade.

2. The broadhead of claim 1, comprising at least one frangible collar for retaining the plurality of blades in an in-flight configuration.

3. The broadhead of claim 1, wherein the chisel tip bores into a target upon impact.

4. The broadhead of claim 1, wherein the first cutting edge of each of the plurality of blades cuts into the target to create a bore.

5. The broadhead of claim 2, wherein the frangible collar disintegrates when the target imparts a force on the impact region of each of the plurality of blades.

6. The broadhead of claim 1, wherein the plurality of blades deploy into a swept-back configuration exposing their respective second cutting edges.

7. The broadhead of claim 6, wherein each of the plurality of blades traverses a plane substantially orthogonal to a longitudinal axis of the broadhead.

8. The broadhead of claim 6, wherein the tip of each of the plurality of blades traverses an arc having a center at a location where the blade is pivotally coupled to the channel.

9. The broadhead of claim 6, wherein the second cutting edge of each of the plurality of blades cuts into the target to widen the bore as the broadhead penetrates the target.

10. The broadhead of claim 1, wherein a tip of the chisel tip is distal of the distal end of the ferrule.

11. The broadhead of claim 1, wherein a tip of the chisel tip is proximate the distal end of the ferrule.

12. The broadhead of claim 1, wherein one or more of the plurality of recesses is configured for relieving pressure as the broadhead penetrates a target.

13. The broadhead of claim 1, wherein one or more of the plurality of channels is configured for relieving pressure as the broadhead penetrates a target.

14. The broadhead of claim 1, wherein one or more of the plurality of recesses and one or more of the plurality of channels are configured for relieving pressure as the broadhead penetrates a target.

15. The broadhead of claim 1, wherein the proximal end of the ferrule is configured for attaching the broadhead to a shaft of an arrow or a bolt.

16. The broadhead of claim 1, wherein the broadhead rotates during flight and continues to rotate as the broadhead penetrates and travels within a target.

* * * * *